(12) United States Patent
Bergen

(10) Patent No.: US 10,401,032 B2
(45) Date of Patent: Sep. 3, 2019

(54) TOROIDAL COMBUSTION CHAMBER

(71) Applicant: POWER GENERATION TECHNOLOGIES DEVELOPMENT FUND, L.P., Naperville, IL (US)

(72) Inventor: Ernst Bergen, Winnipeg (CA)

( * ) Notice: Subject to any disclaimer, the term of this patent is extended or adjusted under 35 U.S.C. 154(b) by 0 days.

(21) Appl. No.: 14/701,618

(22) Filed: May 1, 2015

(65) Prior Publication Data

US 2015/0260408 A1    Sep. 17, 2015

Related U.S. Application Data

(63) Continuation of application No. 14/466,360, filed on Aug. 22, 2014, now Pat. No. 9,052,116, which is a continuation-in-part of application No. 14/455,866, filed on Aug. 8, 2014, now Pat. No. 9,243,805, which is a continuation of application No. 12/608,269, filed on Oct. 29, 2009, now Pat. No. 8,863,530.

(60) Provisional application No. 61/109,660, filed on Oct. 30, 2008.

(51) Int. Cl.
| | |
|---|---|
| *F23R 3/52* | (2006.01) |
| *F01D 1/36* | (2006.01) |
| *F02K 7/00* | (2006.01) |
| *F02C 3/16* | (2006.01) |
| *F23R 3/28* | (2006.01) |
| *F23R 3/06* | (2006.01) |
| *F23R 3/34* | (2006.01) |

(52) U.S. Cl.
CPC .............. *F23R 3/52* (2013.01); *F01D 1/36* (2013.01); *F02C 3/165* (2013.01); *F02K 7/005* (2013.01); *F23R 3/06* (2013.01); *F23R 3/28* (2013.01); *F23R 3/34* (2013.01)

(58) Field of Classification Search
CPC ...... F23R 3/52; F01D 1/34; F01D 1/36; F02C 3/05; F02C 3/062; F02C 3/085; F02C 3/09
See application file for complete search history.

(56) References Cited

U.S. PATENT DOCUMENTS

| | | | |
|---|---|---|---|
| 1,061,206 A | 5/1913 | Tesla | |
| 2,739,782 A | 3/1956 | White | |
| 3,007,311 A | 11/1961 | Amero | |
| 3,045,428 A | 7/1962 | McLean | |
| 3,157,793 A | 11/1964 | Adkins | |
| 3,274,757 A * | 9/1966 | Wapler | B01D 45/14 415/108 |

(Continued)

FOREIGN PATENT DOCUMENTS

| | | |
|---|---|---|
| CN | 1187232 A | 7/1998 |
| CN | 1858498 A | 5/2008 |

(Continued)

OTHER PUBLICATIONS

First Office Action in corresponding Chinese Application No. 2016042801605970 (dated May 4, 2016), 4 pages.

(Continued)

*Primary Examiner* — Gerald L Sung
*Assistant Examiner* — William Breazeal
(74) *Attorney, Agent, or Firm* — Locke Lord LLP

(57) ABSTRACT

A device comprising a combustion toroid for receiving combustion-induced centrifugal forces therein to continuously combust fluids located therein and an outlet for exhaust from said combustion toroid.

1 Claim, 14 Drawing Sheets

(56) References Cited

U.S. PATENT DOCUMENTS

| | | |
|---|---|---|
| 3,309,866 A | 3/1967 | Kydd |
| 3,688,496 A | 9/1972 | Sorensen |
| 3,751,908 A | 8/1973 | Colwell et al. |
| 3,831,854 A | 8/1974 | Sato et al. |
| 3,899,875 A | 8/1975 | Oklejas et al. |
| 3,990,228 A | 11/1976 | Bailey et al. |
| 3,999,377 A | 12/1976 | Oklejas et al. |
| 4,010,018 A | 3/1977 | Kantor |
| 4,018,043 A | 4/1977 | Clemmens |
| 4,036,584 A | 7/1977 | Glass |
| 4,040,251 A | 8/1977 | Heitmann et al. |
| 4,043,393 A | 8/1977 | Fisher et al. |
| 4,078,529 A | 3/1978 | Warwick |
| 4,084,371 A | 4/1978 | Howald |
| 4,109,549 A | 8/1978 | Vincent |
| 4,116,273 A | 9/1978 | Fisher et al. |
| 4,127,453 A | 11/1978 | Radebold |
| 4,136,530 A | 1/1979 | Kantor |
| 4,151,709 A * | 5/1979 | Melconian .......... F02C 3/14 60/755 |
| 4,186,554 A | 2/1980 | Possell |
| 4,197,700 A | 4/1980 | Jahnig |
| 4,201,512 A | 5/1980 | Marynowski et al. |
| 4,229,938 A | 10/1980 | Gallagher |
| 4,236,490 A | 12/1980 | Correll |
| 4,241,576 A | 12/1980 | Gertz |
| 4,334,841 A | 6/1982 | Barlow |
| 4,347,698 A | 9/1982 | Nelson |
| 4,357,794 A | 11/1982 | Nelson |
| 4,367,639 A | 1/1983 | Kantor |
| 4,375,150 A | 3/1983 | Nikiforakis |
| 4,381,462 A | 4/1983 | Radebold |
| 4,441,337 A | 4/1984 | Kantor |
| 4,524,587 A | 6/1985 | Kantor |
| 4,528,012 A * | 7/1985 | Sturgill .......... C03B 5/237 432/180 |
| 4,534,699 A | 8/1985 | Possell |
| 4,563,875 A | 1/1986 | Howald |
| 4,564,490 A | 1/1986 | Omori et al. |
| 4,567,730 A * | 2/1986 | Scott .......... F23R 3/002 60/752 |
| 4,590,761 A | 5/1986 | Zettner |
| 4,586,328 A | 11/1986 | Howald |
| 4,620,414 A | 11/1986 | Christ |
| 4,741,154 A | 5/1988 | Eidelman |
| 4,795,113 A | 1/1989 | Minovitch |
| 4,825,521 A | 5/1989 | Frotschner et al. |
| 4,835,960 A | 6/1989 | Skoczkowski et al. |
| 4,843,823 A | 7/1989 | Freedman |
| 4,912,923 A | 4/1990 | Lin |
| 4,916,905 A | 4/1990 | Havercroft et al. |
| 5,065,073 A | 11/1991 | Frus |
| 5,090,198 A | 2/1992 | Nightingale et al. |
| 5,109,671 A | 5/1992 | Haasis |
| 5,111,655 A | 5/1992 | Shekleton |
| 5,138,831 A | 8/1992 | Cowan, Sr. |
| 5,148,084 A | 9/1992 | Frus |
| 5,161,368 A | 11/1992 | Pomerleau |
| 5,237,814 A | 8/1993 | Chen |
| 5,245,252 A | 9/1993 | Frus et al. |
| 5,263,313 A | 11/1993 | Chow |
| 5,279,110 A | 1/1994 | Lin |
| 5,309,718 A | 5/1994 | Loving |
| 5,384,051 A | 1/1995 | McGinness |
| 5,399,942 A | 3/1995 | Frus |
| 5,404,868 A | 4/1995 | Sankrithi |
| RE34,962 E | 6/1995 | Shekleton et al. |
| 5,474,043 A | 12/1995 | Mallen |
| 5,501,070 A | 3/1996 | Lin |
| 5,558,783 A | 9/1996 | McGuinness |
| 5,561,350 A | 10/1996 | Frus et al. |
| 5,709,076 A | 1/1998 | Lawlor |
| 5,839,270 A | 11/1998 | Jirnov et al. |
| 5,864,221 A | 1/1999 | Downs et al. |
| 5,885,057 A | 3/1999 | Wootten |
| 5,932,940 A * | 8/1999 | Epstein .......... F01D 5/28 257/414 |
| 5,960,625 A | 10/1999 | Zdvorak, Sr. |
| 6,192,669 B1 | 2/2001 | Keller et al. |
| 6,247,472 B1 | 6/2001 | Moseley |
| 6,257,195 B1 | 7/2001 | Van Moor |
| 6,272,863 B1 | 8/2001 | Pfefferle et al. |
| 6,273,673 B1 | 8/2001 | Wootten |
| 6,298,821 B1 | 10/2001 | Bolonkin |
| 6,334,299 B1 | 1/2002 | Lawlor |
| 6,341,590 B1 | 1/2002 | Barrera et al. |
| 6,375,412 B1 | 4/2002 | Dial |
| 6,503,067 B2 | 1/2003 | Palumbo |
| 6,510,683 B1 | 1/2003 | Lawlor |
| 6,534,551 B2 | 3/2003 | Allam et al. |
| 6,535,096 B1 | 3/2003 | Rapoport et al. |
| 6,608,543 B2 | 8/2003 | Rapoport et al. |
| 6,692,232 B1 | 2/2004 | Letourneau |
| 6,726,443 B2 | 4/2004 | Collins et al. |
| 6,779,964 B2 | 8/2004 | Dial |
| 6,796,123 B2 | 9/2004 | Lasker |
| 6,854,437 B1 | 2/2005 | Vazquez |
| 6,897,832 B2 | 5/2005 | Essig, Jr. et al. |
| 6,955,053 B1 | 10/2005 | Chen |
| 6,973,792 B2 | 12/2005 | Hicks |
| 6,983,604 B1 | 1/2006 | Tafoya |
| 7,062,900 B1 | 6/2006 | Brun |
| 7,100,370 B2 | 9/2006 | Klement et al. |
| 7,117,827 B1 | 10/2006 | Hinderks |
| 7,127,897 B2 | 10/2006 | Carrea |
| 7,168,949 B2 | 1/2007 | Zinn et al. |
| 7,180,216 B2 | 2/2007 | Hirzel et al. |
| 7,192,244 B2 | 3/2007 | Grande, III et al. |
| 7,237,385 B2 | 7/2007 | Carrea |
| 7,318,317 B2 | 1/2008 | Carrea |
| 7,337,606 B2 | 3/2008 | Brouillette et al. |
| 7,341,424 B2 | 3/2008 | Dial |
| 7,372,185 B2 | 5/2008 | Hirzel |
| 7,382,332 B2 | 6/2008 | Essig, Jr. et al. |
| 7,390,163 B2 | 6/2008 | Clauson |
| 7,404,286 B2 | 7/2008 | Lior |
| 7,438,027 B1 | 10/2008 | Hinderks |
| 7,497,012 B2 | 3/2009 | Procin et al. |
| 7,533,719 B2 | 5/2009 | Hinson et al. |
| 7,540,324 B2 | 6/2009 | deRouffignac et al. |
| 7,559,701 B2 | 7/2009 | Knobloch et al. |
| 7,562,707 B2 | 7/2009 | Miller |
| 7,591,129 B2 | 9/2009 | Worrell |
| 2002/0000085 A1 | 1/2002 | Hall et al. |
| 2002/0124569 A1 | 9/2002 | Treece et al. |
| 2002/0195886 A1 * | 12/2002 | Collins .......... F01D 1/34 310/52 |
| 2003/0048165 A1 | 3/2003 | Rapoport et al. |
| 2003/0053909 A1 | 3/2003 | O'Hearen |
| 2003/0074883 A1 | 4/2003 | Cirrito et al. |
| 2004/0000145 A1 | 1/2004 | Leyva et al. |
| 2004/0000148 A1 | 1/2004 | Kuo et al. |
| 2004/0154307 A1 | 8/2004 | Carrea |
| 2005/0019154 A1 | 1/2005 | Dial |
| 2005/0044842 A1 | 3/2005 | Dinu |
| 2005/0072454 A1 | 4/2005 | Cohen et al. |
| 2005/0103329 A1 | 5/2005 | Essig et al. |
| 2005/0109671 A1 | 5/2005 | Kettley et al. |
| 2005/0126755 A1 | 6/2005 | Berry et al. |
| 2005/0169743 A1 | 8/2005 | Hicks |
| 2005/0180845 A1 | 8/2005 | Vreeke et al. |
| 2005/0126171 A1 | 9/2005 | Lasker |
| 2005/0214109 A1 | 9/2005 | Grande et al. |
| 2005/0241315 A1 | 11/2005 | Schlote |
| 2005/0276681 A1 | 12/2005 | Avina |
| 2005/0284127 A1 | 12/2005 | Tobita et al. |
| 2006/0029894 A1 | 2/2006 | Zinn et al. |
| 2006/0078436 A1 | 4/2006 | Neeb et al. |
| 2006/0088138 A1 | 4/2006 | Jouanneau |
| 2006/0131978 A1 | 6/2006 | Hirzel et al. |
| 2006/0216149 A1 | 9/2006 | Wilson |
| 2006/0236701 A1 | 10/2006 | Carrea |
| 2006/0283170 A1 | 12/2006 | Clauson |
| 2007/0131182 A1 | 6/2007 | Mirabile |

(56) References Cited

U.S. PATENT DOCUMENTS

| | | | |
|---|---|---|---|
| 2007/0137220 A1 | 6/2007 | Carrea | |
| 2067/0145856 | 6/2007 | Hirzel et al. | |
| 2007/0151227 A1 | 7/2007 | Worrell | |
| 2007/0184287 A1* | 8/2007 | Hazel | C04B 35/195 428/446 |
| 2007/0284108 A1 | 12/2007 | Roes et al. | |
| 2007/0289733 A1 | 12/2007 | Hinison et al. | |
| 2007/0297904 A1 | 12/2007 | Hoeger | |
| 2008/0017380 A1 | 1/2008 | Vinegar et al. | |
| 2008/0035346 A1 | 2/2008 | Nair et al. | |
| 2008/0035347 A1 | 2/2008 | Brady et al. | |
| 2008/0035348 A1 | 2/2008 | Vitek | |
| 2008/0035705 A1 | 2/2008 | Menotti | |
| 2008/0038144 A1 | 2/2008 | Maziasz et al. | |
| 2008/0041059 A1* | 2/2008 | Teets | F23D 14/66 60/737 |
| 2008/0128134 A1 | 6/2008 | Mudunuri et al. | |
| 2008/0135244 A1 | 6/2008 | Miller | |
| 2008/0135253 A1 | 6/2008 | Vinegar et al. | |
| 2008/0141921 A1 | 6/2008 | Hinderks | |
| 2008/0142216 A1 | 6/2008 | Vinegar et al. | |
| 2008/0142217 A1 | 6/2008 | Pieterson et al. | |
| 2008/0173442 A1 | 7/2008 | Vinegar et al. | |
| 2008/0173444 A1 | 7/2008 | Stone | |
| 2008/0173449 A1 | 7/2008 | Fowler | |
| 2008/0173450 A1 | 7/2008 | Goldberg et al. | |
| 2008/0174115 A1 | 7/2008 | Lambirth | |
| 2008/0185147 A1 | 8/2008 | Vinegar et al. | |
| 2008/0217003 A1 | 9/2008 | Kuhlman et al. | |
| 2008/0217004 A1 | 9/2008 | de Rouffignac | |
| 2008/0217015 A1 | 9/2008 | Vinegar et al. | |
| 2008/0217016 A1 | 9/2008 | Stegemeier et al. | |
| 2008/0232745 A1 | 9/2008 | Knobloch et al. | |
| 2008/0236132 A1 | 10/2008 | Molnar | |
| 2008/0236831 A1 | 10/2008 | Hsu | |
| 2008/0256923 A1 | 10/2008 | Witteveen | |
| 2008/0276622 A1 | 11/2008 | Johnson et al. | |
| 2008/0277113 A1 | 11/2008 | Stegemeier et al. | |
| 2008/0283246 A1 | 11/2008 | Karanikas et al. | |
| 2008/0304974 A1 | 12/2008 | Marshall et al. | |
| 2009/0013694 A1 | 1/2009 | Hernandez et al. | |
| 2009/0014180 A1 | 1/2009 | Istegemeier et al. | |
| 2009/0014181 A1 | 1/2009 | Vinegar et al. | |
| 2009/0071652 A1 | 3/2009 | Vinegar | |
| 2009/0090158 A1 | 4/2009 | Davidson et al. | |
| 2009/0090509 A1 | 4/2009 | Vinegar et al. | |
| 2009/0095476 A1 | 4/2009 | Nguyen et al. | |
| 2009/0095479 A1 | 4/2009 | Karanikas et al. | |
| 2009/0135254 A1 | 5/2009 | Chiang-Lin | |
| 2014/0196432 A1 | 7/2014 | Lam et al. | |

FOREIGN PATENT DOCUMENTS

| | | |
|---|---|---|
| DE | 102006051063 | 2/2007 |
| DE | 102005039024 | 5/2008 |
| EP | 0 079 149 A1 | 5/1983 |
| GB | 137550 A | 1/1920 |
| GB | 186082 | 9/1922 |
| GB | 753561 | 7/1956 |
| GB | 847359 A | 9/1960 |
| GB | 1150226 | 4/1969 |
| GB | 1416011 A | 12/1975 |
| GB | 2451704 A | 2/2009 |
| JP | 42-18488 B | 3/1965 |
| JP | 033858 C | 11/1971 |
| JP | 06-058543 A | 3/1994 |
| JP | 08-121101 A | 5/1996 |
| JP | 08121101 | 5/1996 |
| JP | 101144 B | 1/1998 |
| RU | 2343296 C1 | 1/2009 |
| SU | 2124746 C1 | 1/1991 |
| WO | 8806226 A1 | 8/1988 |
| WO | 89/06308 A1 | 7/1989 |
| WO | 94/41073 A | 12/1996 |
| WO | 242642 A1 | 5/2002 |
| WO | 99/42763 A1 | 8/2005 |
| WO | 2009022103 A2 | 2/2009 |
| WO | 20100051338 A1 | 6/2010 |

OTHER PUBLICATIONS

Third Office Action in corresponding Chinese Application No. 200980142490.6 (dated Jul. 9, 2014).

Office Action in corresponding Japanese Application No. 2011-534736 (dated Jun. 10, 2014).

International Search Report for co-pending PCT application No. PCT/US2009/062479, dated Dec. 22, 2009.

PCT Written Opinion of the International Searching authority for co-pending PCT International Application No. PCT/US2009/062479 (dated Dec. 22, 2009).

Second Chinese Office Action Filing No. 200980142490.6 (dated Jan. 20, 2014).

Second Russian Office Action Filing No. 2011116885 (with English translation).

First Office Action in corresponding Russian Application No. 2011116885/06(025036) (English and Russian language).

Office Action in corresponding Japanese Application No. 2011-534736 (English and Japanese language)—dated Jan. 6, 2015).

Office Action in corresponding Chinese Application No. 200980142490.6 (dated Jul. 1, 2013).

Nov. 17, 2015 Canadian Office Action in Canadian Patent Application No, 2,739,808.

Jul. 17, 2015—Korean Office Action Notice of Preliminary Rejection—Application No. 10-2011-7011768.

Russian Office Action issued in corresponding Russian Application No. 2011116885/06 dated Dec. 15, 2014, including Decision Grant and The Examiner's Report with English Translation.

Russian Office Action in corresponding Russian Application No. 2011116885/06 dated Dec. 15, 2014, including Decision and Grant and The Examiner's Report with English Translation.

Accuratus "Accuratus Materials" Jan. 18, 2007 https://web.archive.org/web/20070118183832/http://ww.accuratus.com/zirc.html.

Feb. 18, 2016—Korean Patent Office, Decision of Rejection of Patent—Application No. 10-2011-7011768.

Office Action in corresponding Japanese Application No. 2011-534736 (dated Sep. 6, 2013).

Supplementary European Search Report for EP Application No. 09624110.2 (dated Dec. 7, 2016) (7 pages).

Extended European Search Reported dated Apr. 12, 2017, Publication No. 2347099.

Supplementary European Search Report, dated May 2, 2017, Publication No. 2347099.

Rejection Decision for Chinese Application No. 201516612344.2 (dated Oct. 24, 2017) (7 pages).

Canadian Office Action in Canadian Application No. 2 739 808 (dated May 9, 2018) (6 pages).

* cited by examiner

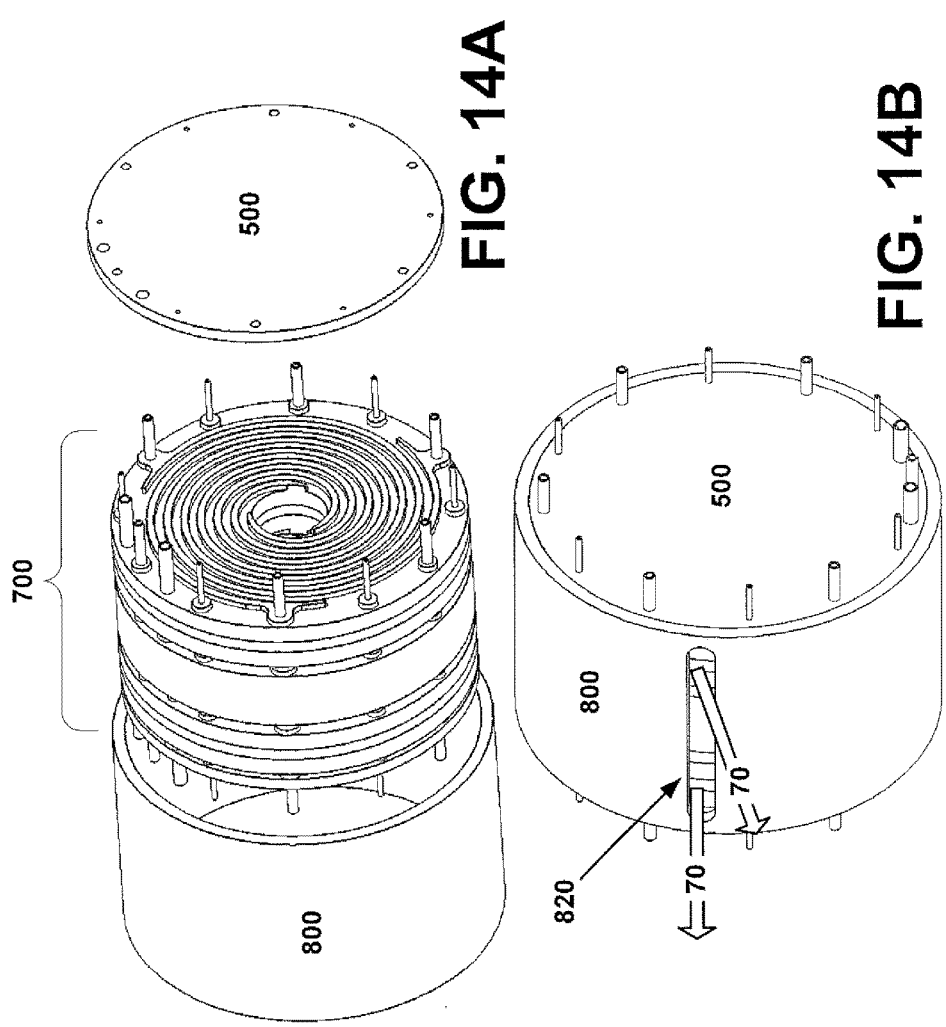

TOROIDAL COMBUSTION CHAMBER

This application is a continuation of U.S. patent application Ser. No. 14/455,866, filed Aug. 8, 2014, which is a continuation of U.S. patent application Ser. No. 12/608,269, filed Oct. 29, 2009, now U.S. Pat. No. 8,863,530, and through each of the foregoing patent applications claims the benefit of the filing date of U.S. Provisional Patent Application Ser. No. 61/109,660, filed on Oct. 30, 2008. This application is also a continuation of U.S. patent application Ser. No. 14/466,360, filed Aug. 22, 2014, which is a continuation-in-part of U.S. patent application Ser. No. 14/455,866, filed Aug. 8, 2014, is a continuation-in-part of U.S. patent application Ser. No. 12/608,269, filed Oct. 29, 2009, and through each of the foregoing patent applications claims the benefit of the filing date of U.S. Provisional Patent Application Ser. No. 61/109,660, filed on Oct. 30, 2008. The disclosures of each of the foregoing patent applications being incorporated herein by reference in their entirety.

FIELD OF THE INVENTION

Disclosed are embodiments of the invention which relate to, among other things, turbines and methods of generating power.

BACKGROUND

Prior art turbines and generators utilizing boundary layer effects to generate power, for example, those disclosed in U.S. Pat. No. 1,061,206 to Tesla and U.S. Pat. No. 7,341,424 to Dial, suffer from limited power output and efficiency.

Prior art turbines and generators relying on the teachings of Tesla have failed to take advantage of the simplicity of the Tesla design to generate maximized power output and there exists a need in the art for improved turbines and power generators.

SUMMARY OF THE INVENTION

By providing a combustion chamber extending about the circumference of the disc pack, a relatively simple construction permits considerable efficiency and power output. The configuration permits air and fuel to be mixed directly about the combustion chamber to ensure complete combustion of the fuel. This permits air and fuel to be mixed at a plurality of locations circumferentially about the chamber for increasing the power output by permitting more fuel to be consumed in an efficient manner and by imparting more rotational movement to the products of combustion.

By providing air and fuel tangentially into the combustion chamber, the combustion of the fuel can be contained about the outer periphery of the combustion chamber by the centrifugal forces imparted onto the fuel and air rotating about the combustion chamber. The centrifugal forces ensure that products of combustion are substantially fully reacted before overcoming the centrifugal force and outward pressure from the disc pack prior to being exhausted for optimal use of fuel.

By providing a modular design made of advanced materials, a flexible capacity made with simple components can be provided. The modular design allows the device to be configured to fit the specific requirements of the situation and unlike the expensive fixed varieties can be reduced or expanded at any time as desired without machining. The pathways through the device are smooth and without drastic direction changes to reduce flow resistance and prevent tar buildups.

BRIEF DESCRIPTION OF THE DRAWINGS

FIGS. 14A-B illustrate exemplary heat exchanger assemblies according to exemplary embodiments of the present invention.

In the drawings like characters of reference indicate corresponding parts in the different and/or interrelated figures.

DETAILED DESCRIPTION

Figure 1:
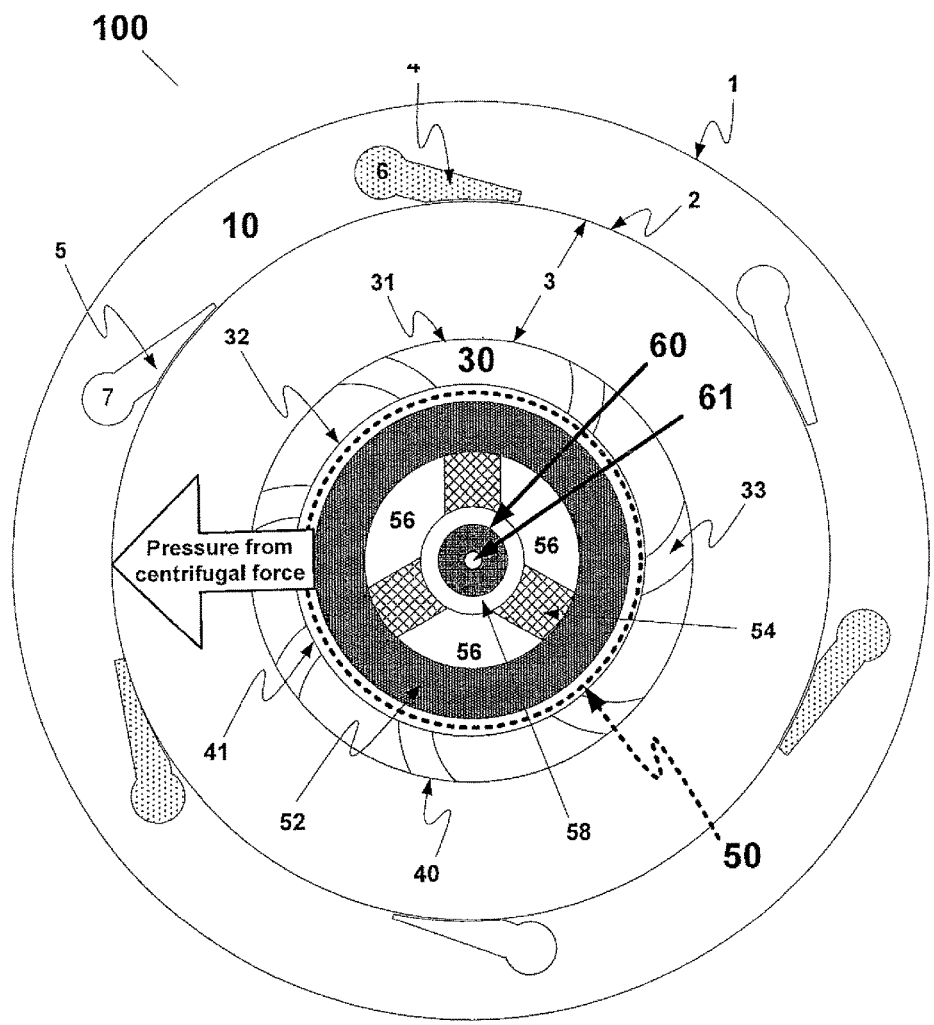
FIG. 1 illustrates a combustion turbine according to an exemplary embodiment of the present invention.

FIG. 1 illustrates a turbine 100, which may comprise a combustion housing 10, nozzle ring 30 and a disc pack 50. Disc pack 50 holds a drive shaft 60, such that the drive shaft 60 experiences the rotation of the disc pack 50. Disc pack 50 transfers power output from within turbine 100 to another device (for example, a generator or pump) via drive shaft 60. A turbine axis 61 is located at the geometric center of the face of drive shaft 60. The turbine axis longitudinally runs along the shaft 60.

Combustion housing 10 carries within itself a combustion chamber 3 located about the turbine axis 61 and through which combusted fluid travels to generate power via shaft 60. The combustion housing 10 has an outside surface 1 and an inside surface 2. According to an exemplary embodiment of the present invention, combustion housing 10 may be made or designed through known machining and/or molding processes with any material that can withstand high heat stresses and thermal shock, for example, but not limited to, alumina, graphite, silicon carbide (SiC), etc. Alternatively, this exemplary embodiment of the present invention may be made or designed through known machining and/or molding processes with stainless steel for smaller applications. Those skilled in the art will recognize, however, that material used to form combustion housing 10 of turbine 100 is not critical to the present invention and may include any material or composites thereof, which serve the objectives enumerated in the various embodiments according to the present invention.

According to the exemplary embodiment of the present invention illustrated in FIG. 1, inside surface 2 may substantially enclose combustion chamber 3. In another exemplary embodiment of the present invention, inside surface 2 may create a toroidal combustion chamber 3. In yet another exemplary embodiment, inside surface 2 may create a toroidal combustion chamber 3 whose cross section is substantially round (e.g., circular or elliptical or any other shape with rounded edges). In another exemplary embodiment, inside surface 2 may enclose nozzle ring 30, disc pack 50 and/or drive shaft 60. According to another exemplary embodiment of the present invention, inside surface 2 may come into substantial contact with the interior portions of turbine 100. Those skilled in the art would also recognize that those components that may be within combustion housing 10 may come into substantial contact with the inside surface 2 of combustion housing 10.

The combustion housing 10 contains openings 6 and 7 disposed within the combustion housing wall defined by surfaces 1 and 2. Fuel and air may flow through openings 6 and 7 into channels 4 and 5 respectively. In one exemplary embodiment of the present invention, fuel channel 4 and air channel 5 may be placed in any organization located about combustion housing 10 providing fuel and air from within the combustion housing wall into the combustion chamber 3. According to an exemplary embodiment of the present invention depicted in FIG. 1, the fuel and air channels 4 and 5 may be located circumferentially about the turbine axis 61. In a further exemplary embodiment of the present invention in FIG. 1, the fuel and air channels 4 and 5 may alternate in their placement about the circumference of combustion housing 10. Those skilled in the art may recognize numerous other alternative organizations of fuel and air channels 4 and 5 about the combustion housing 10 and combustion chamber 3 depending on the desired operation of turbine 100. In the exemplary embodiment of the present invention according to FIG. 1, fuel and air channels 4 and 5 may provide their respective fluids in flow patterns which aid combustion of the mixture in combustion chamber 3. Alternatively, the fuel and air channels 4 and 5 may provide their respective fluids in flow patterns which ultimately will increase the power translated to drive shaft 60 from those fluids' interaction with disc pack 50.

Further description of combustion housing 10 and combustion chamber 3 will be made with reference to FIG. 2.

Referring back to FIG. 1, in one exemplary embodiment of the present invention, the nozzle ring 30 is disposed between combustion chamber 3 and disc pack 50. Nozzle ring 30 is formed of a distal surface 31, a proximal surface 32 and a plurality of combustion fluid ("CF") nozzles 33. Each CF nozzle 33 is formed between a distal space 40 and a proximal space 41. Distal surface 31 substantially encloses the remaining portions of combustion chamber 3 not enclosed by inner surface 2. Those portions of combustion chamber 3 not enclosed by either inner surface 2 or distal surface 31 may provide combustion fluid through any one of the plurality of CF nozzles 33 through their respective distal spaces 40. In an exemplary embodiment according to the present invention, the combustion fluid from combustion chamber 3 enters any one of the plurality of CF nozzles 33 at their respective distal spaces 40 and exits via their respective proximal spaces 41.

In an exemplary embodiment according to the present invention, nozzle ring 30 may be integrated with combustion housing 10 to substantially form a surface encompassing combustion chamber 3. According to this embodiment, a surface encompassing combustion chamber 3 may comprise inner surface 2, distal surface 31, and the walls defining CF nozzle 33. According to this exemplary embodiment, passage of fluid from combustion chamber 3 to disc pack 50 may be achieved through any number of the plurality of CF nozzles 33.

In another embodiment according to the present invention, nozzle ring 30 is a distinct component of turbine 100, separate and apart from combustion housing 10. Those skilled in the art will recognize that integration of nozzle ring 30 with combustion housing 10 can affect the same combustion chamber 3 characterization described above. Further, those skilled in the art will also recognize that separation of nozzle ring 30 from combustion housing 10 will not result in substantial deviation from the objectives of the various embodiments of the present invention enumerated herein.

According to an exemplary embodiment of the present invention, nozzle ring 30 may be designed of any material that withstands high heat stress and thermal shock, for example, SiC, stainless steel, etc. The material selected according to this particular embodiment of the present invention makes the nozzle ring 30 especially suitable for obtaining high temperatures and allowing combustion fluid coming in contact therewith to further combust.

According to an exemplary embodiment of the present invention illustrated in FIG. 1, disc pack 50 resides within nozzle ring 30. Disc pack 50 contains a plurality of discs 52 of such diameter and thickness and between-disc spacing that when rotated by and within a fluid, a boundary layer effect allows further fluid to move through disc pack 50 to cause rotation of disk pack 50. The spacing between plates typically is selected to be directly proportional to fluid viscosity to achieve the desired boundary layer effect. Each disc 52 may be connected to a shaft mount 58 by a plurality of spokes 54. Alternatively, the disc pack 50 may be attached to the drive shaft 60 by a plurality of spokes 54. According to an exemplary embodiment of the present invention, rotation of disc pack 50 may rotate drive shaft 60 about turbine axis 61 creating power. According to another exemplary embodiment of the present invention, combustion fluid flows through the disc pack 50 over any number of the plurality of discs 52 thereby driving drive shaft 60 in the direction of the combustion fluid flow. The drive shaft 60 may be integrally attached to disc pack 50 at shaft mount 58. In another embodiment according to the present invention, disc pack 50 may use shaft mount 58 to relate the rotation caused by the combustion fluid through its discs 52 to drive shaft 60.

Figure 2:
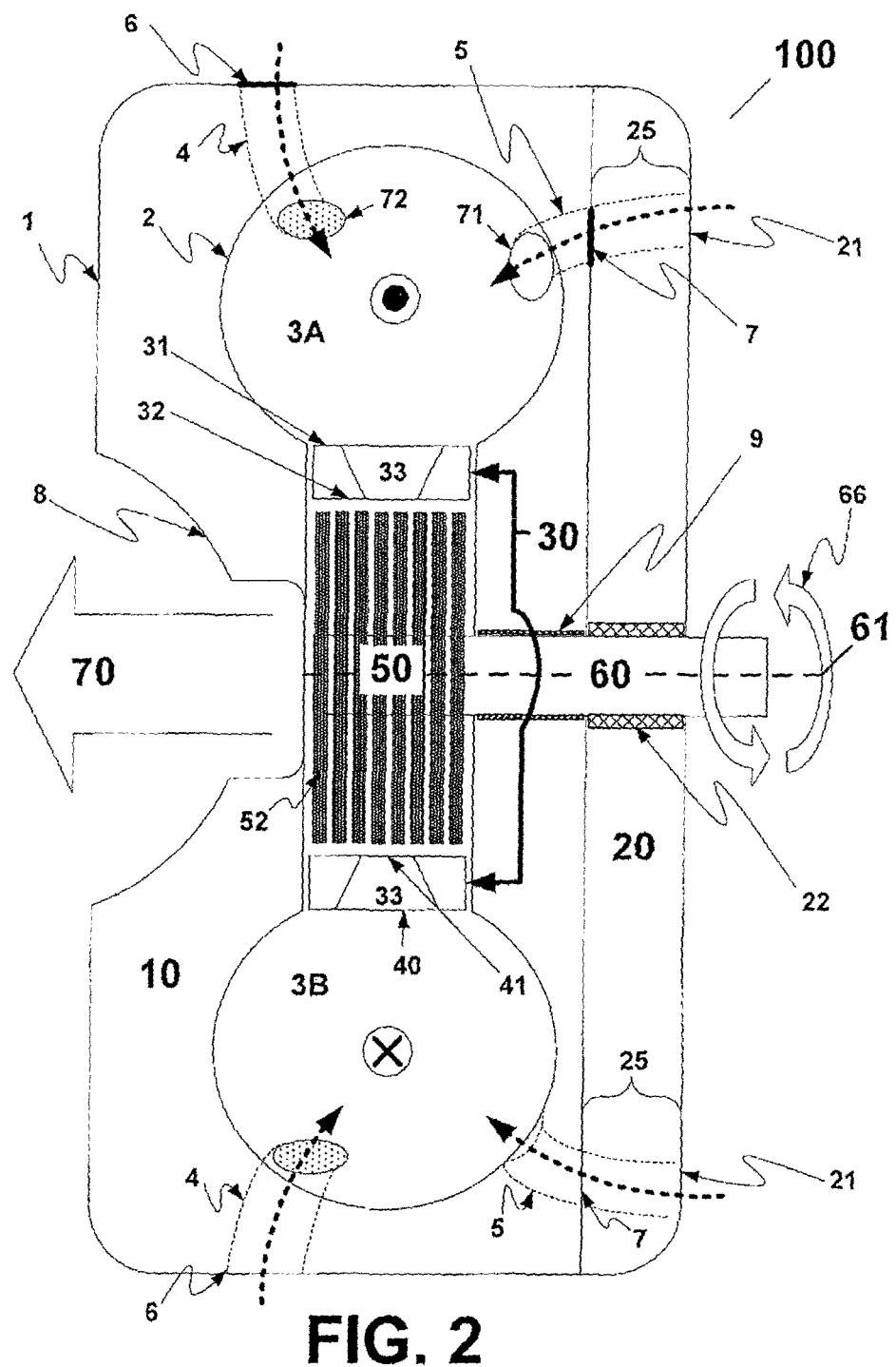
FIG. 2 illustrates a profile view of a combustion turbine according to an exemplary embodiment of the present invention.
Figure 3:
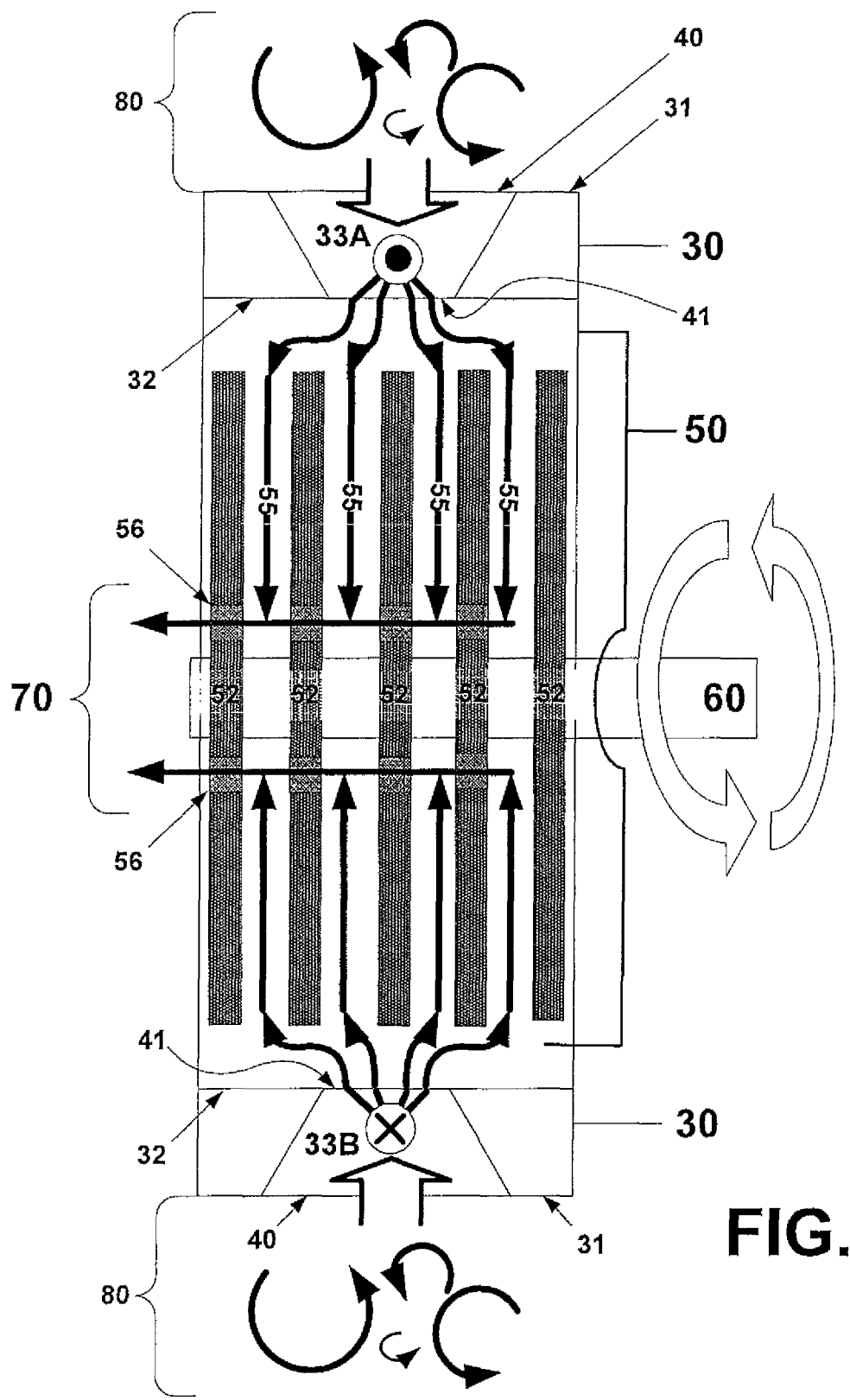
FIG. 3 illustrates a profile view of a nozzle ring and a disc pack according to an exemplary embodiment of the present invention.

According to the embodiment of the present invention illustrated in FIGS. 1-3, exhaust 70 (depicted in the exemplary embodiments of the present invention illustrated by FIGS. 2 and 3), leaves the disc pack 50 in a direction along the turbine axis longitudinally through any one of the plurality of disc pack exits 56 formed from the arrangement of the spokes 54 of disc pack 50. According to an embodiment of the present invention, exhaust 70 exiting turbine 100 at turbine exit 8 may be the product of a plurality of combustions taking place between the combustion fluid and the combustion chamber 3, nozzle ring 30 and disc pack 50. In another embodiment of the present invention, the exhaust 70 exiting the turbine 100 may be a product of the combustions occurring within combustion chamber 3 and any one of nozzle ring 30 and disc pack 50. In yet another embodiment of the present invention, exhaust 70 exiting turbine 100 through turbine exit 8 is produced as a result of substantially complete combustion of combustion fluid within chamber 3.

In another exemplary embodiment, combustion fluid within combustion chamber 3 may receive centrifugal forces through increased pressure created by the rotation of disc pack 50. According to one operation of this embodiment, the centrifugal forces generated by rotation of the disc pack 50 creates increased pressure beneath nozzle ring 30. The increased pressure beneath nozzle ring 30 may act on the combustion fluid within combustion chamber 3, allowing longer combustion of the combustion fluid within chamber 3. According to another operation of this embodiment, rotation of the disc pack 50 causes the combustion fluid in combustion chamber 3 to move distally from the turbine axis 61 towards inner surface 2 and/or the walls defining any number of the plurality of CF nozzles 33. This allows for further combustion of the combustion fluid within chamber 3 and/or within nozzle ring 30, achieving substantially reacted product within turbine 100. Following such reactions according to these embodiments of the present invention, the substantially reacted product exists from turbine 100 as exhaust 70.

With reference to the exemplary embodiments according to the present invention described above, the rotation of disc pack 50 may force combustion fluid into contact with the proximal surface 32 of nozzle ring 30 allowing for further combustion reactions of the combustion fluid located near and between edges of discs 52 and proximal surface 32.

FIG. 2 depicts an exemplary embodiment of the side view of turbine 100 according to the present invention. Within combustion housing 10, combustion chamber 3 is illustrated in two sections 3A and 3B. Within combustion chamber 3A is a circled symbol "●" while combustion chamber 3B contains a circled symbol "X". According to this and further illustrations of embodiments of the present invention, an encircled "●" symbolizes fluid flows out of the page while an encircled "X" symbolizes fluid flows into the page. Accordingly, combustion chamber sections 3A and 3B depict fluid flow in a counter clockwise direction (viewing turbine 100 from the side where drive shaft 60 protrudes through turbine 100) causing the same counter clockwise rotation 66 at drive shaft 60.

In the exemplary embodiment of the present invention depicted in FIG. 2, turbine 100 comprises combustion housing 10 enclosing nozzle ring 30, disc pack 50 and drive shaft 60 at combustion housing shaft aperture 9. Shaft aperture 9 may comprise any type of aperture enabling fluid rotation of shaft 60 within combustion housing 10 (e.g., ball bearings, magnetic bearings, lubricated surfaces, etc.). Those skilled in the art will recognize numerous ways in which aperture 9 may be designed and configured to permit consistent and uninhibited rotation of shaft 60 during turbine 100 operation.

The outputs of the inner workings within combustion housing 10 may exit turbine 100 via turbine exit 8. According to one embodiment of the present invention, turbine exit 8 may be adapted to connect to other devices for treatment and expulsion of exhaust gases 70 from turbine 100. In another embodiment, turbine exit 8 may be configured for controlled release of exhaust gases 70 from turbine 100. In yet another embodiment, the shape of turbine exit 8 may influence the vacuum effect generated at the flow points of exhaust gas 70.

FIG. 2 depicts an exemplary embodiment of the combustion fluid mixing in combustion chamber sections 3A and 3B according to the present invention. Referring first to combustion chamber section 3A, each of fuel and air channels 4 and 5, respectively, enter combustion chamber 3A via channel outlets 72 and 71, respectively. Channel outlet 71/72 may be any aperture in inner surface 2 of the combustion housing through which fluid from the respective channel may enter combustion chamber 3. According to this exemplary embodiment according to the present invention, dashed lines located in fuel channel 4 and air channel 5 illustrate the fluid flow of the fluid in each channel. Each channel 4 and 5 contains an opening 6 and 7, respectively, within the wall formed between surfaces 1 and 2 of chamber housing 10. Opening 6 of fuel channel 4 may allow for entry of fuel injectors or any other type of fuel providing apparatus/arrangement known to those skilled in the art. According to the exemplary embodiment of the present invention in FIG. 2, opening 7 of air channel 5 may allow for entry of air from outside the combustion housing 10 or outside any other type of combustion providing apparatus/arrangement known to those skilled in the art.

According to the embodiment of FIG. 2, combustion housing 10 may be coupled to air plate 20. Air plate 20 may provide an aperture 22 for reception and rotation of drive shaft 60 within the coupled configuration of combustion housing 10, disc pack 50 and air plate 20. According to one embodiment of the present invention, aperture 22 functions in like manner to aperture 9 of combustion housing 10. Alternatively, aperture 22 may utilize separate fluid external to air plate 20 to maintain consistent rotation of shaft 60 rotating therein.

Air plate 20 may receive air from a source external to turbine 100 through one or more air inlets 21. Each air inlet 21 may channel received air into one or more openings 7 of one or more air channels 5 through air nozzle 25. In this particular embodiment of the present invention, air plate 20 provides the air which is dispensed into combustion chamber 3 of combustion housing 10. In an alternative embodiment of the present invention, air plate 20 may be integrally formed with combustion housing 10. In another embodiment according to the present invention, air nozzle 25 may be seamlessly coupled to air channel 5 to create fluent air flow from air inlet 21 through outlet 71.

Fluent air flow through air channel 5 allows for smoother air flows with diminished turbulence in the fluid as it enters combustion chamber 3. In an exemplary embodiment of the present invention, centrifugal supplies of input air 75 (illustrated in the exemplary embodiment of the present invention in FIGS. 5B, 6 and 7B) about the surface of air plate 20 permits air inlet 21 to feed turbulent input air 75 into air nozzle 25 whose geometry works to reduce turbulence of the input air 75 to establish air flows out of outlet 71 of air channel 5 that are substantially tangential to input surface 2. In another embodiment of the present invention, the turbulence of input air 75 may be greatly reduced by the combined geometries of any one of air inlet 21, air nozzle 25, opening 7 of air channel 5 or outlet 71. Further discussion related to the turbulence reducing geometries of the aforementioned embodiments of the present invention will be had with reference to FIGS. 6 and 7A-B.

According to the exemplary embodiment of the present invention illustrated in FIG. 2, the flows of fuel and air from the openings 72 and 71 of their respective fuel and air channels 4 and 5 flow substantially tangential into combustion section 3A and then mix into a combustible fluid as they flow throughout the circumference of combustion chamber 3 from section 3A to 3B. The initial combustion of the combustible fluid in the combustion chamber 3 may be accomplished by means of ignition or heating from within the combustion housing 10. Those skilled in the art will recognize numerous ways by which combustible fluid may be initially ignited within combustion chamber 3.

As per another operation of an exemplary embodiment of the present invention, combustion housing 10 may achieve high enough temperatures to combust all combustible fluid therein and produce substantially reacted product before the combustion fluid exits the turbine 100. In such an operation, numerous continuous combustions of combustion fluid take place in combustion housing 10. Alternatively, combustion fluid experiences longer amounts of time exposed to combustion processes within combustion housing 10.

According to one embodiment of the present invention, the combustion chamber may use catalysts (e.g., surface coatings) to cause substantially complete combustion reactions in the combustion fluid. Alternatively, another embodiment may use the forces exerted by the operation of turbine 100 components to act as catalysts to cause substantially reacted products from the combustion fluid. According to these embodiments of the present invention, at high enough temperatures, portions of turbine 100 cease to combust combustion fluid and instead catalytically convert that combustion fluid into fully reacted product. In an exemplary embodiment, pressure in combustion chamber 3 during the combustion process compresses the combustion gases and contains the combustion flames about inner surface 2. The pressure in combustion chamber 3 may be achieved by the backpressure from the rotating discs 52 which behave like a centrifugal compressor. Alternatively, these pressures may be achieved from the centrifugal force of the spinning combustion gases in a vortex flow. As per the operation of this exemplary embodiment, back pressure and centrifugal forces act as catalysts to ensure substantially complete combustion of the fuel and the primary products of combustion before exiting through disc exits 56 and turbine exit 8 to ensure optimal efficiency of combustion in a simple construction which can be readily maintained. In other words, the back pressure and centrifugal forces may create the time and temperature conditions to allow the fluids to react against each other and act as catalysts to ensure substantially complete combustion of the fuel and the primary products of combustion before exiting through disc exits 56 and turbine exit 8 to ensure optimal efficiency of combustion in a simple construction which can be readily maintained.

Figure 8:
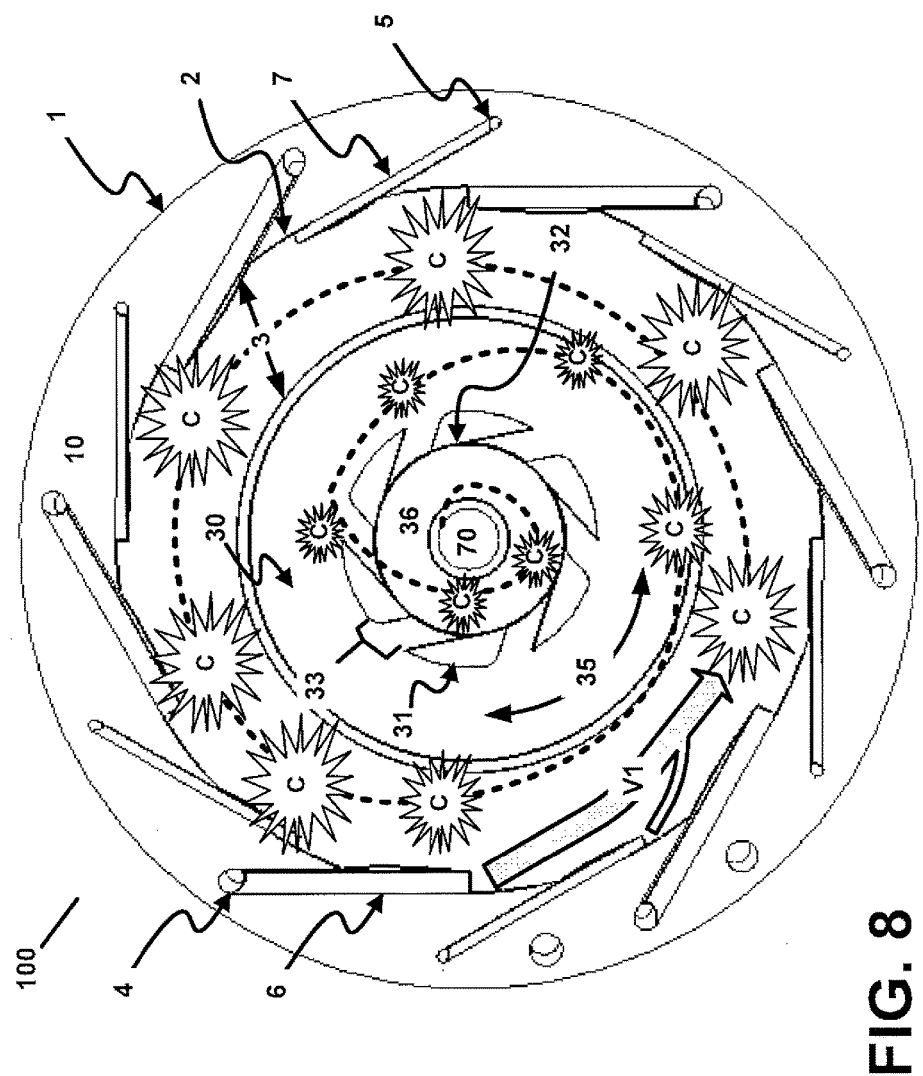
FIG. 8 illustrates another combustion turbine according to an exemplary embodiment of the present invention.

According to one embodiment of the present invention, as illustrated by FIG. 8, once an initial volume of combustible fluid is ignited (VI), subsequent channeling of fuel and air into the combustion chamber 3 will result in continuous combustion of the mixed fluid flows (C). In this embodiment, the continuous provision of fuel and air via fuel and air channels 4 and 5, respectively, creates a continuous combustion vortex throughout chamber 3 (shown in FIG. 8 in dashed line). The vortex flow of combustion fluid throughout chamber 3 aids in the full and complete combustion of that fluid according to this embodiment of the present invention. In another embodiment, once an initial volume of combustible fluid is ignited, the rotation of the disc pack 50 will create sufficient force to push subsequent combustible fluid volumes into ignitable contact with combustion fluid (e.g., the previously ignited combustible fluid flow) thereby continuing combustion throughout combustion chamber 3. According to yet another embodiment, once initially ignited, there is a continuous combustion of injected fuel and air in the combustion chamber 3 which is induced into a circumferential combustion flow direction about the turbine axis 61 by the tangential injection of fuel and air into the combustion chamber 3. The expanding gases resulting from the combustion are forced under pressure through CF nozzles 33 in the nozzle ring 30 to be similarly directed in the circumferential flow direction about disc pack 50.

According to one embodiment of the present invention, once an initial volume of combustible fluid is ignited, subsequent channeling of fuel and air into the combustion chamber 3 will result in continuous combustion of the mixed fluid flows. In this embodiment, the continuous provision of fuel and air via fuel and air channels 4 and 5, respectively, creates a continuous combustion vortex throughout chamber 3. The vortex flow of combustion fluid throughout chamber 3 aids in the full and complete combustion of that fluid according to this embodiment of the present invention. In another embodiment, once an initial volume of combustible fluid is ignited, the rotation of the disc pack 50 will create sufficient force to push subsequent combustible fluid volumes into ignitable contact with combustion fluid (e.g., the previously ignited combustible fluid flow) thereby continuing combustion throughout combustion chamber 3. According to yet another embodiment, once initially ignited, there is a continuous combustion of injected fuel and air in the combustion chamber 3 which is induced into a circumferential combustion flow direction about the turbine axis 61 by the tangential injection of fuel and air into the combustion chamber 3. The expanding gases resulting from the combustion are forced under pressure through CF nozzles 33 in the nozzle ring 30 to be similarly directed in the circumferential flow direction about disc pack 50.

According to an embodiment of the present invention, combustion fluid may be forced into contact with inner surface 2 due to pressure generated by the rotation of the discs 52 of disc pack 50. In one aspect of this embodiment of the present invention, combustion fluid may experience pressure from the centrifugal forces from disc pack 50 moving it distally from turbine axis 61. Centrifugal forces generated by the circumferential flow contain the combustion of the fuel adjacent inner surface 2 of the combustion chamber while the products of combustion spiral inwardly to flow between discs 52 and subsequently exit through turbine exit 8. Specifically with reference to combustion chamber section 3A, the pressure from the disc pack 50 centrifugal forces may urge the combustion fluid along the distal portions of the inner surface 2 of combustion chamber section 3A opposite nozzle ring surface 31. According to this embodiment of the present invention, maintaining combustion fluid in contact with the distal portions of the combustion chamber 3 may permit further combustion reactions to take place thereby allowing full and complete combustion of the combustion fluid in the combustion housing 3. By obtaining all the combustive output from the combustion fluid to generate rotation in the disc pack 50 (and therefore drive shaft 60), this embodiment of the present invention utilizes the combined operation of the components of turbine 100 to fully combust all entering fuel and air. According to this embodiment of the present invention, the pressure used on the combustion fluid minimizes exhaust 70 containing incompletely combusted products. According to the aforementioned embodiments of the present invention, the time of combustion of combustion fluid in combustion chamber 3 is maximized by use of centrifugal forces thereby achieving an increased number of instances of combustion along any chamber portion 3A to 3B.

Another exemplary embodiment of the present invention may include an inner surface 2 of combustion chamber 3 which has a highly emissive coating or surface properties to focus the radiant heat generated during the combustion process into the center of the combustion chamber 3. Higher emissivity constants indicate a material's ability to reflect infrared or thermal radiation. According to this exemplary embodiment of the present invention, highly emissive coatings or surface properties, such as those found with SiC or other such coating materials known to those skilled in the art, on inner surface 2 refocus radiant heat energies into the center of the combustion chamber 3 to provoke further combustion of the combustion fluid located therein. An additional advantage to having a highly emissive coating as it relates to this exemplary embodiment of the present invention is that it extends the life of the material comprising the combustion chamber 3 and reduces surface temperatures experienced on the walls of the combustion housing 10 defined by surfaces 1 and 2. According to another embodiment of the present invention, high emissivity may also preserve other components of turbine 100 (e.g., nozzle ring 30, discs 52 of disc pack 50 when combustion chamber 3 is integrated with nozzle ring 30, etc.).

In yet another exemplary embodiment according to the present invention of FIG. 2, the heat of inner surface 2, distal surface 31, proximal surface 32 or discs 52 may further combust the combustion fluid in its travel through turbine 100. In this embodiment of the present invention, the heated surfaces of the components of turbine 100 may be hot enough to cause successive combustion of the combustion fluid thereby creating exhaust 70 without any unused combustion products.

In another embodiment according to the present invention, a toroidal shape of combustion chamber 3 allows for the achievement of a high enough temperature to instantly combust any fuel in the chamber once the chamber has warmed up and exceeded the critical temperature to combust such fuel. A substantially round toroidal shape of inner surface 2 may have an optical focal point in the center of chamber 3 to concentrate infrared heat radiated from the chamber surface to help further combust/react fuel. In accordance with other embodiments of the present invention, the substantially round toroid of combustion chamber 3 enables combustion fluid therein to achieve high temperatures and remain within the combustion chamber 3 for an elongated period of time exposed to such high temperatures. According to these embodiments of the present invention, combustion chamber 3's shape enables substantially full and complete combustion of combustion fluid therein.

In the illustrated embodiment of FIG. 2, eight discs 52 are oriented parallel to one another so as to be perpendicular to the turbine axis 61 of the turbine shaft at evenly spaced positions in the axial direction. Although eight discs 52 are depicted according to the embodiment of FIG. 2, any plurality of discs 52 may be suitable for the disclosed embodiments of the present invention. The discs 52 may be secured together by a plurality of fasteners extending through cooperating apertures spaced circumferentially about a periphery of the discs 52 and located within each of the spokes 54 of the spacers and the discs 52. At the periphery of the discs 52 where they are maintained in a spaced apart relationship, suitable spacer washers are mounted therebetween to receive the fasteners therethrough at each of the fastener locations. All of the disc exits 56 of discs 52 are aligned with one another for communicating exhaust gases therethrough (see FIG. 3.). In conjunction with the aforementioned embodiments of the present invention, discs 52 run at such high temperatures that their surfaces may break down any contaminant on their surface allowing them to remain clean. Additionally, as mentioned with relation to other embodiments of the present invention, the high temperatures of discs 52 further combust combustion fluid entering the disc pack 50 from CF nozzle 33.

Referring to FIG. 3, the combustion of mature combustion fluid 80 may create turbulent fluid flows. According to an embodiment of the present invention in FIG. 3, turbulent combustion fluid 80 is received by distal opening 40 in nozzle ring 30. With specific attention to the nozzle ring section turning out of the page (33A), travel of combustion fluid 80 through CF nozzle 33A may redirect the combustion fluid to flow tangentially over the adjacent surfaces of disc pack 50 (similarly in the direction of fluid flow in combustion chamber 3). According to the embodiment of FIG. 3, once combustion fluid exits opening 41 of CF nozzle 33A, it flows over the surfaces of discs 52 where it may be received within discs 52 in streams 55. According to this embodiment, streams 55 may experience limited impedance in exiting turbine 100 due to a vacuum effect caused by the exiting flow of exhaust 70 through turbine exit 8. The vacuum effect created by flow of exhaust 70 through turbine exit 8 may substantially remove all pending exhaust 70 within disc exits 56 allowing for subsequent exhaust streams 70 to occupy those spaces. According to the embodiments of the present invention, the vacuum effect of exhaust 70 enables more efficient operation of turbine 100.

According to one embodiment, CF nozzles 33A and 33B promote tangential flow of combustion fluid over a certain surface area of disc pack 50. By increasing the surface area receiving the combustion fluid there over, this embodiment of the present invention achieves higher power output. According to another embodiment, CF nozzles 33A and 33B contain proximal openings 41 which aid the tangential flow of combustion fluid over a certain surface area of disc pack 50. By controlling the flow of combustion fluid out of CF nozzles 33A and 33B, proximal openings 41 may accelerate the fluid through nozzle ring 30 thereby introducing more forceful combustion fluid over discs 52 of disc pack 50 and thereby achieve higher power output. In yet another embodiment of the present invention, a combined use of CF nozzles 33A and 33B and their respective distal and proximal openings, 40 and 41 respectively, may achieve combustion fluid flows that achieve greater power output for turbine 100 (e.g., varying geometries of each to create higher accelerations of combustion fluid, greater tangential flows, etc.) The flow of gases in the tangential direction by the orientation of the CF nozzles 33 serves to drive rotation of turbine 100 by the interaction of the expanding exhaust gases through the space between discs 52. The exhaust gases spiral towards the central openings 56 in the discs 52 to be subsequently exhausted through the turbine exit 8 in chamber housing 10.

Figure 4:
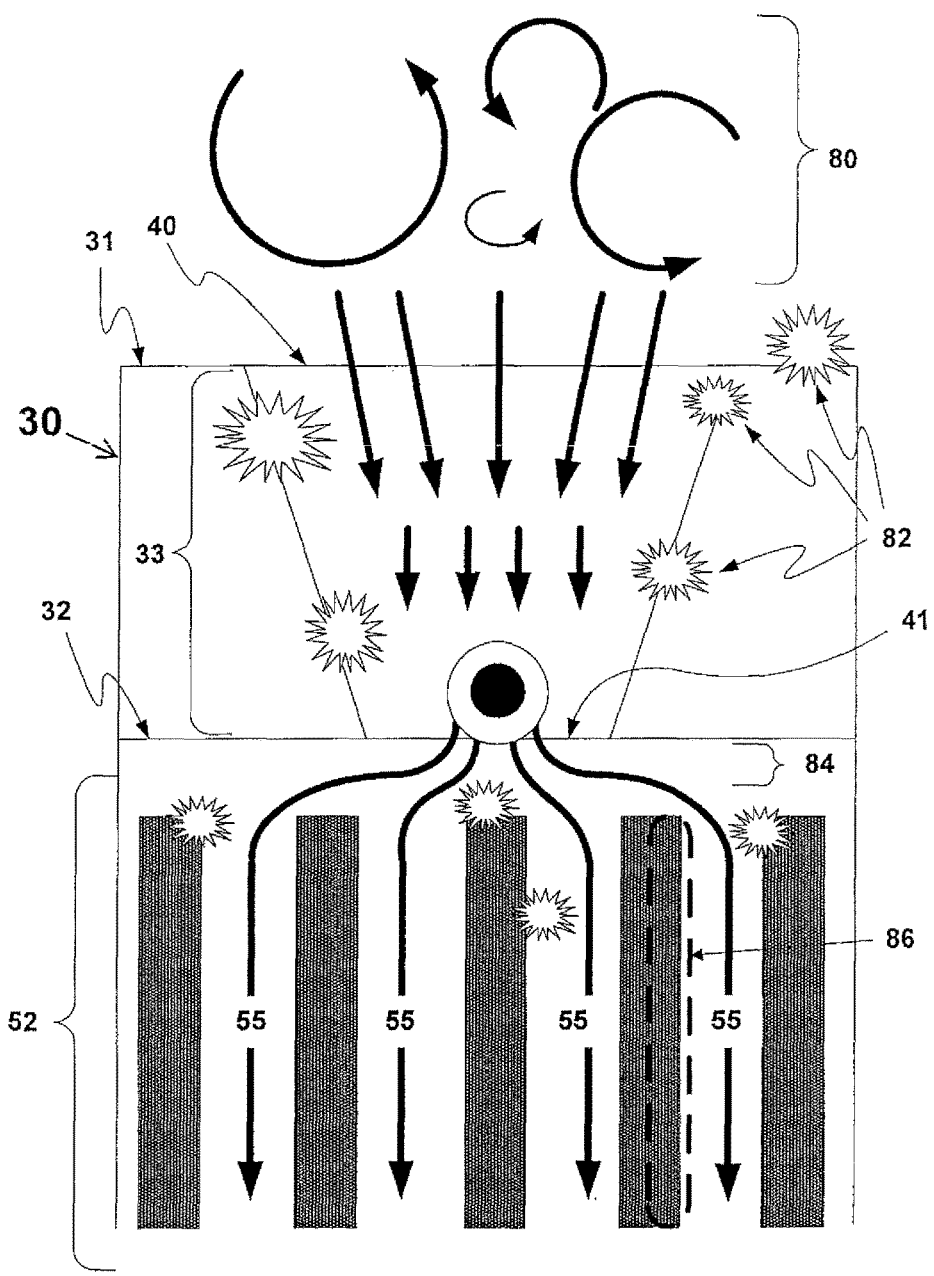
FIG. 4 illustrates a profile view of nozzle ring and disc pack according to an exemplary embodiment of the present invention.

Referring to FIG. 4, the embodiments of the present invention relating to continuous combustion of combustion fluid during turbine 100 operation may be incorporated herein. According to an exemplary embodiment of the present invention, mature combustion fluid 80 has vortices at distal surface 31. However, in this embodiment, catalytic combustions 82 may take place anywhere along nozzle ring 30 at surfaces 31, 32 or along the surface of CF nozzle 33 formed by distal and proximal openings 40 and 41, respectively. The catalytic combustions 82 of mature combustion fluid 80 may aid the full and complete combustion of the combustion fluid while creating further turbulence in the combustion fluid. According to this embodiment of the present invention, CF nozzle 33 promotes the tangential flow 84 of the mature combustion fluid 80 out of proximal opening 41. Similar to previous embodiments of the present invention, combustion fluid 84 (exiting proximal opening 41) may contact surface area 86 of discs 52 through combustion fluid streams 55. Further combustion may occur through contact of combustion fluid streams 55 over surface area 86 according to the aforementioned embodiments of the present invention. According to an exemplary embodiment of the present invention, an increased disc 52 surface area 86 provides for greater torque being produced via the boundary layer effect caused by interaction of streams 55 with discs 52. In another exemplary embodiment, increased surface area 86 promotes further complete combustion about a disc 52 in disc pack 50 using streams 55.

Figure 5A:
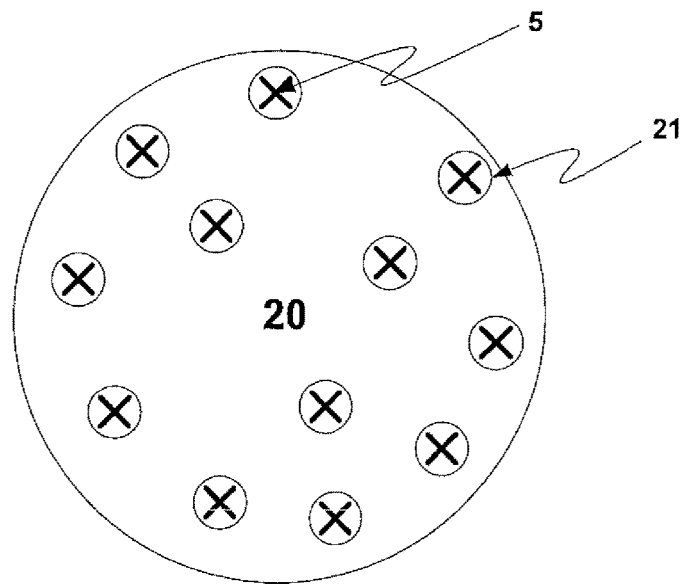
FIGS. 5A-B illustrate an air nozzle according to exemplary embodiments of the present invention.
Figure 5B:
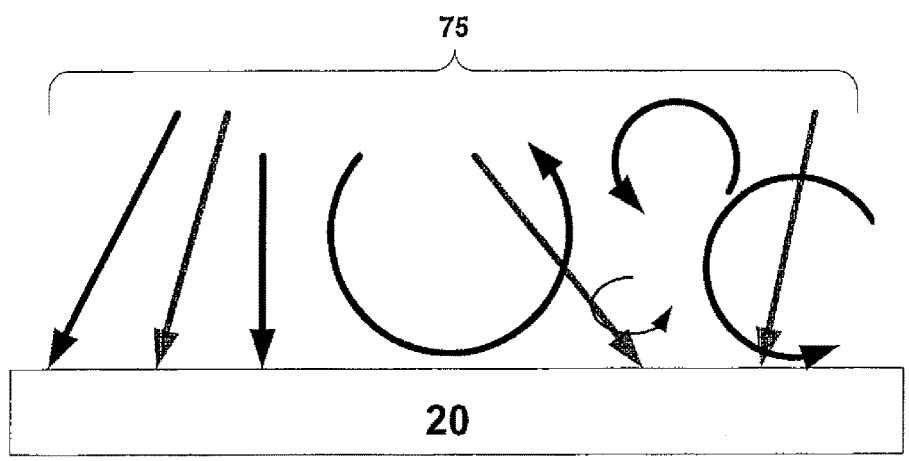

In another illustrative embodiment of the present invention, FIGS. 5A and 5B depict the external air-receiving surface of air plate 20. Air inlets 21 exist on the external air-receiving surface of air plate 20. Air inlets 21 may be arranged in any manner to receive air into turbine 100 through air channel 5. According to an embodiment of the present invention, compressed air 75 is provided in a circumferential pattern onto the air plate 20 thereby making placement of air inlets 21 preferable about that same circumference where such incoming air 75 would be incident on air plate 20. In another embodiment of the present invention, input air 75 may include vortices and eddies that create obstacles for reception of the same within air inlets 21. According to this embodiment, air inlets 21 may be placed in any arrangement on the exterior surface of air plate 20 that optimizes reception of air 75 within turbine 100.

Figure 6:
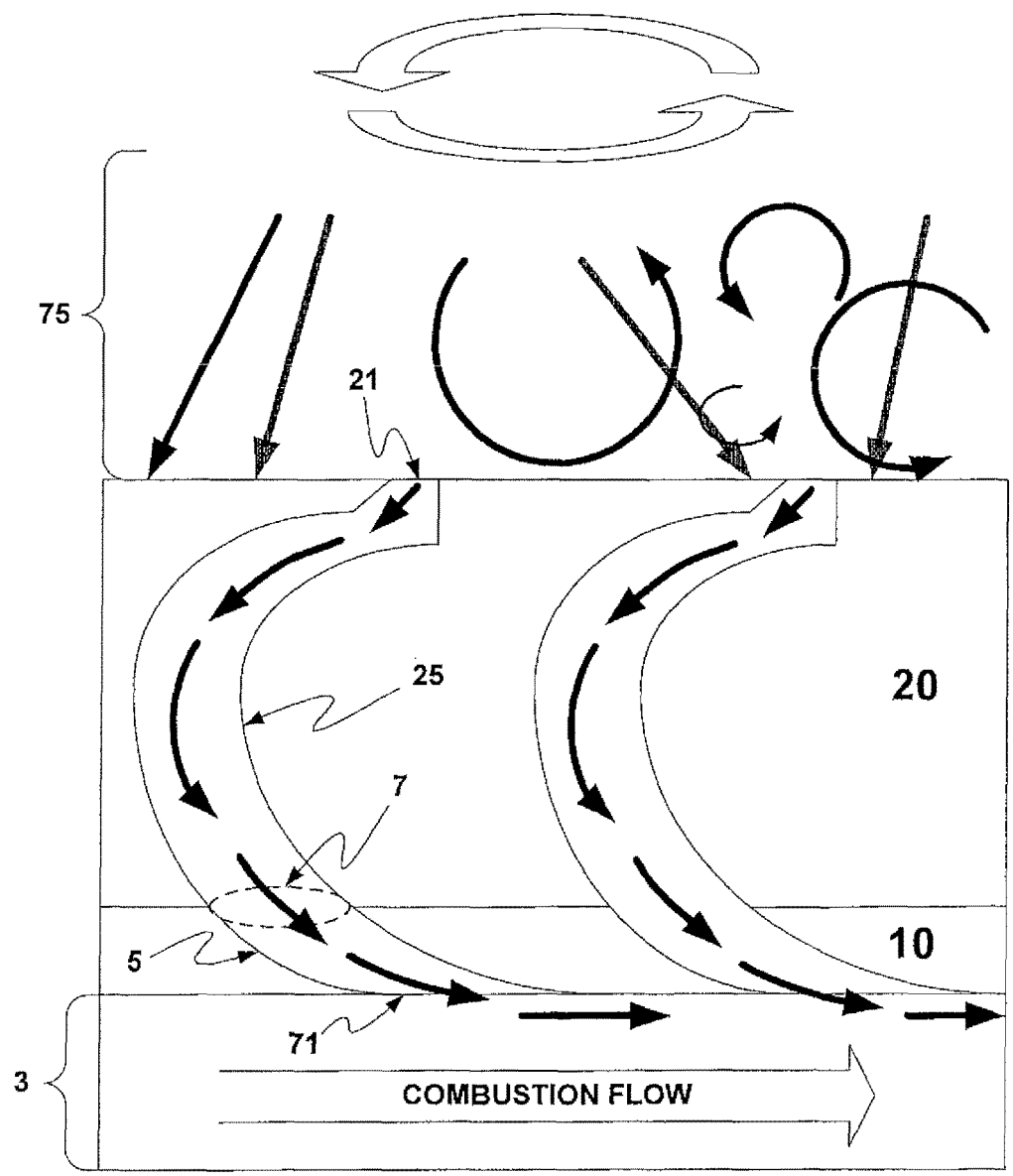
FIG. 6 illustrates a profile view of an air nozzle and combustion chamber according to an exemplary embodiment of the present invention.

FIG. 6 is a side view of air plate 20 according an exemplary embodiment of the present invention. As previously described, turbulent air 75 external to turbine 100 is incident on air plate 20. Air plate 20 may receive streams of the incoming air 75 via one or more air inlets 21. Arrows representing incoming air streams from incoming air 75 flow through air nozzle 25 through opening 7 into combustion housing 10. Once within combustion housing 10, the air streams flow through air channel 5 into combustion chamber 3 via air channel outlet 71. As previously discussed, air nozzle 25 and air channel 5 may be a single conduit for air to flow from air inlet 21 to channel outlet 71 through both the air plate 20 and combustion housing 10. According to an embodiment of the invention, air nozzle 25 may be shaped to reduce swirls and vortices in the incoming air stream 75 so that the air may exit the air nozzle substantially tangential to the combustion flow in combustion chamber 3. An air nozzle 25 according to this embodiment may be a parabolic channel or declining helical channel. Alternatively, the interactions of air nozzle 25, opening 7 and air channel 5 may act to reduce swirls and vortices in the incoming air stream 75. In this manner, momentum of the air flow exiting opening 7 in the circumferential flow direction may have been maintained in that circumferential direction through air plate 20 and into air channel 5 to increase the resultant circumferential flow of the combustion air entering the combustion chamber 3 from outlet 71.

In one embodiment, air inlet 21 includes a hemispherical groove within air plate 20 which receives air 75 that flows into the groove and slowly descends into air nozzle 25. The combined conduit of air nozzle 25, opening 7 and air channel 5 gently bends to reduce random swirls of the incoming air stream while also imparting an intended vortex air flow that may follow that of the fuel and prior combustion fluids within combustion chamber 3. In this embodiment, the incidence of flow losses caused by drastic changes in air stream direction may be avoided. In another embodiment of the present invention, air inlet 21 includes a hemispherical groove within air plate 20 whose bottom-most surface descends parabolically into air plate 20 and convenes with air nozzle 25. In that embodiment, the incoming air 75 may not experience sharp changes in direction thereby avoiding flow losses into and through combustion housing 10. Those skilled in the art will recognize numerous other air inlet shapes and forms that may reduce flow losses into and through air nozzle 25. Alternatively, those skilled in the art will recognize numerous other air inlet shapes and forms that may reduce flow losses into and through combustion housing 10.

In another embodiment, opening 7 may be shaped or formed in such a way to reduce turbulence of exiting air flows into combustion chamber 3. Those skilled in the art may understand opening 7 may have any shape or form that may reduce shock flows of air into combustion chamber 3. In one exemplary embodiment, opening 7 may be a helical ramp which gradually introduces air flowing through air nozzle 25 into combustion chamber 3.

Figure 7A:
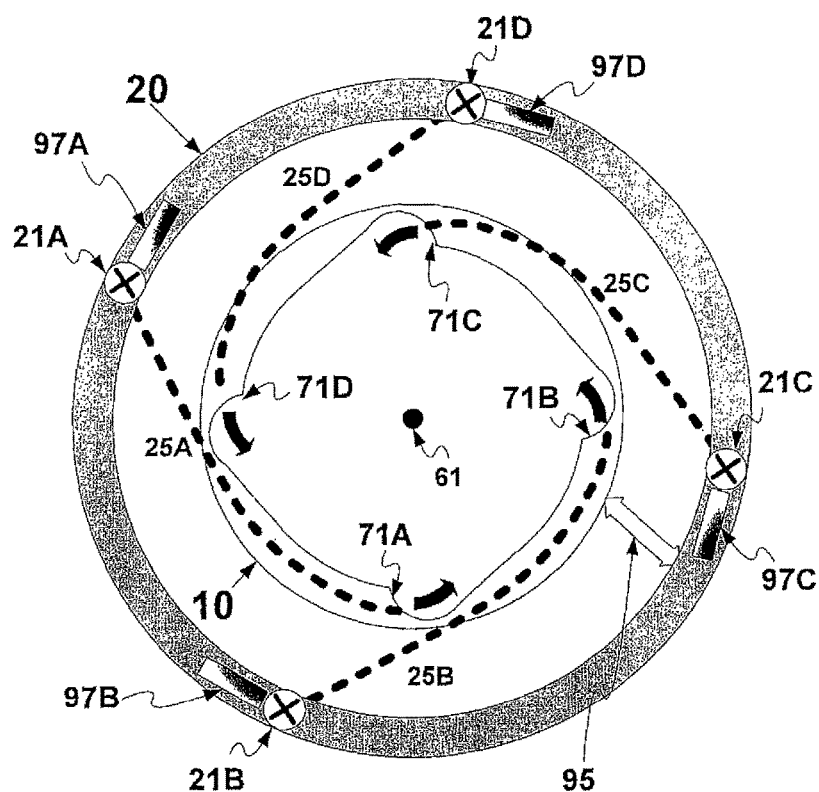
FIGS. 7A-B illustrate other exemplary embodiments of an air nozzle and combustion chamber according to the present invention.

According to the embodiments of the present invention depicted in FIG. 7A, there is an exploded view of air plate 20 and combustion housing 10 concentric with one another with turbine axis 61 as their concentric center. The exemplary embodiment of FIG. 7A depicts air plate 20 and combustion housing 10 with air inlets 21A-D, grooves 97A-D, air nozzles 25A-D and air channel outlets 71A-D, although any number of the aforementioned inlets, grooves, nozzles and outlets may be possessed by other embodiments of the present invention. According to FIG. 7A, distance 95 represents an elongated wall made by the exterior of air plate 20 and inner surface 2 of combustion housing 10. Those skilled in the art may recognize that the distance 95 is merely an aid for viewing the exploded view in FIG. 7A and is not meant to suggest any restrictive distance between air plate 20 and combustion housing 10. Those skilled in the art may understand that any distance 95 between air plate 20 and combustion housing 10 that can permit the disclosed air nozzle 25A-D functionalities would be appropriate according to these embodiments of the present invention. Thus, dashed-line paths 25A-D over wall distance 95 represent air stream passages within the air plate 20—combustion housing 10 wall.

In one embodiment of the present invention, each groove 97A-D represents an indent in air plate 20 which descends further towards combustion housing 10 as input air 75 approaches respective air inlet 21A-D. According to one embodiment, grooves 97A-D may be equal in diameter to air inlet 21A-D. Alternatively, grooves 97A-D may be any diameter permitting a geometry for receiving the incoming air 75. In another embodiment, grooves 97A-D may be partially exposed to incoming air 75 and partially submerged under the exterior air-receiving surface of air plate 20. According to that embodiment, air inlet 21A-D may also be submerged under the exterior air-receiving surface of air plate 20. According to the various embodiments of the present invention, any number of grooves 97 and air inlets 21 may be utilized to efficiently and fluidly transfer random incoming air 75 into air nozzles 25.

In one embodiment of the present invention, air nozzles 25A-D revolve about turbine axis 61 such that the exit of an air nozzle is substantially located under the inlet of another air nozzle. According to one embodiment of the present invention in FIG. 7A, air nozzle 25A allows incoming air 75 from air inlet 21A to exit at 71A which is located at substantially the same radial position as air inlet 21B. In this exemplary embodiment of the present invention, helically descending air nozzle 25A greatly reduces propensity of turbulent air 75 to exit at opening 71A into combustion chamber 3. Additionally, helically descending air nozzle 25A imparts onto air flowing therein a flow pattern substantially emulative of that experience within combustion chamber 3. According to previously described embodiments of air channels above, opening 71A may be shaped to further reduce propensity of turbulent air 75 from exiting into combustion chamber 3. Referring to those embodiments, opening 71A may be shaped or formed to minimize shock flows of air existing at the juncture of opening 71A and combustion chamber 3. In those embodiments, opening 71A may be a gradual helical ramp into combustion chamber 3. Alternatively, opening 71A may have a parabolic ramp into combustion chamber 3. Those skilled in the art would recognize opening 71A may be shaped or formed in any manner that will provide minimized shock flows of air into combustion chamber 3. Those skilled in the art would further recognize opening 71A may be shaped or formed in any manner that will reduce turbulence of incoming air 75 into combustion chamber 3. According to this exemplary embodiment, the helically descending conduit of air nozzle 25A simultaneously reduces turbulence in the incoming air stream and imparts on the air stream a vortex flow that would be substantially tangential to the combustion flow within combustion chamber 3 (referring also to FIG. 6.). As per this embodiment of the present invention, each helically descending air nozzle 25A-D is constructed to coexist throughout the wall formed between the exterior surface of air plate 20 and inner surface 2 of combustion chamber 10. In another embodiment according to the invention, air nozzles 25A-D may form substantially curved, substantially non-helical conduits which permit for greater addition of conduits in the device without impeding flow paths of prior air nozzles 25. In another embodiment according to the present invention, air nozzles 25A-D may be designed to fit substantially close to one another to simultaneously achieve desired air flows described above but avoid conduit interference.

Figure 7B:
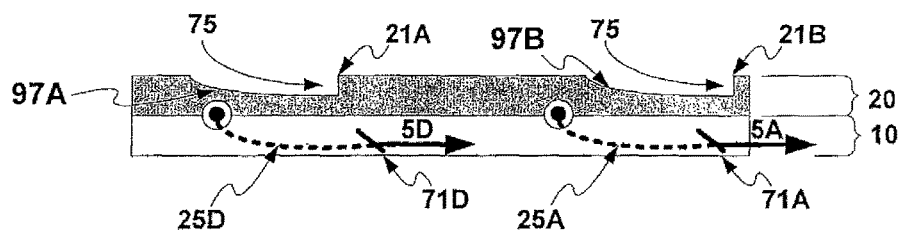

FIG. 7B is a further illustration of an exemplary embodiment according to the present invention. As described in FIG. 7A, input air 75 enters air inlet 21A over groove 97A. In one embodiment, groove 97A reduces turbulence of incoming air 75. In another embodiment, groove 97A aids in capturing random air streams on air plate 20. As depicted in the embodiment of FIG. 7B, air flow 75 entering air inlet 21A flows through the wall of air plate 20 into combustion housing 10. Once within combustion housing 10, air nozzle 25A channels the air into air channel 5A to exit into combustion chamber 3 (not shown) at opening 71A. According to this embodiment of the present invention, opening 71A is located in substantially the same location as the air inlet and groove 25B and 97B respectively. As per this embodiment, air nozzle 25A may be formed as any type of revolving conduit that would allow for exiting of input air in a direction substantially tangential to the combustion fluid flow path within combustion chamber 3. The combustion air and the fuel may then mixed directly in the combustion chamber about the full circumference of the turbine assembly as the air and fuel flow in the circumferential combustion flow direction.

An air plate 20 constructed according to the embodiments of the present invention may be made from numerous machining processes known to those skilled in the art, such as, for example, CNC machining. The air plate 20 may be formed of any material known to those skilled in the art which possesses temperature tolerances that can receive high-temperature air, for example, carbon fiber or stainless steel.

According to the embodiments of the present invention, the components comprising turbine 100 may be interchanged and exchanged according to requirements of turbine 100. Interchangeability and exchange of components of turbine 100 are made possible due to their modularity. According to one embodiment, the components may be separated at their junctures (e.g., junction between air plate 20 and combustion housing 10, disc pack 50 and combustion housing 10, etc.) to effect replacement and/or coupling of the components to additional components according to the requirements of turbine 100 (e.g., use of combustion housing 10 and disc pack 50 with a first air plate 20 to generate 50 Watts and removal of air plate 20 for a different component for use of combustion housing 10 and disc pack 50 to generate 500 Watts). Those skilled in the art would recognize numerous ways in which the various embodiments of the turbine 100 components enumerated herein can be coupled to maintain the disclosed functionalities and operations.

As previously disclosed, an exemplary turbine 100 may be constructed without disc pack 50 to operate to combust combustion fluids entering into the turbine chamber 3. As previously disclosed, the modular nature of turbine 100 may be utilized in conjunction with the previously disclosed adaptability of turbine exit 8 to connect to other devices for treatment and expulsion of exhaust gases 70 from turbine 100.

Figure 9:
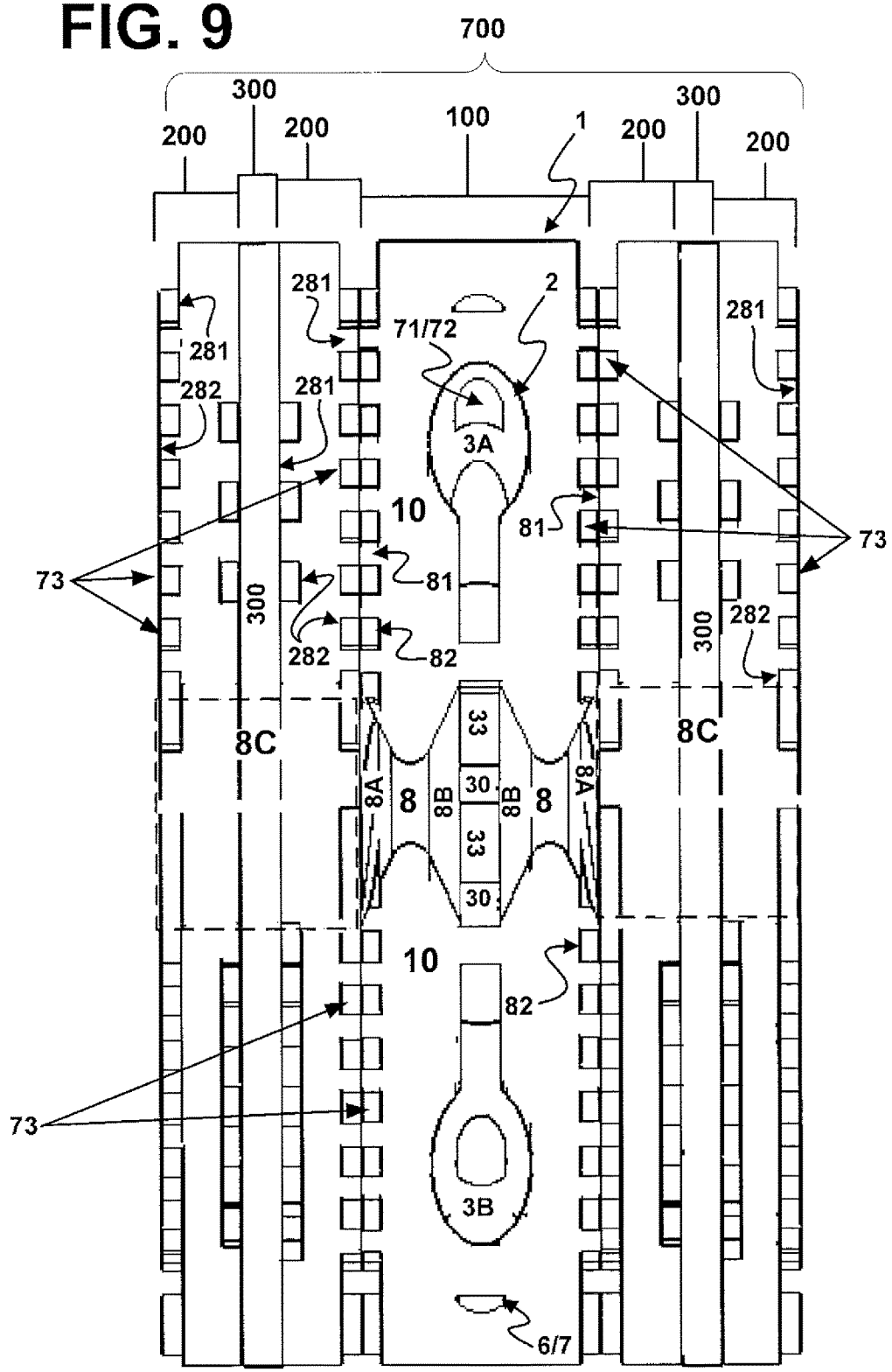
FIG. 9 illustrates an exemplary heat exchanger for an exemplary combustion turbine.

In the exemplary embodiment of FIG. 9, a modular turbine 100 comprising combustion housing 10, combustion chamber 3, illustrated in two sections 3A and 3B, nozzle ring 30, fuel/air channels 6/7 circumscribing the chamber 3, and exhaust exit 8, having an inner exit surface 8b and an outer exit surface 8A. As previously described, combustion chamber sections 3A and 3B depict fluid flow in a counter clockwise direction.

As previously illustrated in FIG. 2, FIG. 9 may also depict an exemplary embodiment of the combustion fluid entry and eventual mixing in combustion chamber sections 3A and 3B according to the present invention. Referring first to combustion chamber section 3A, each of fuel and air channels 4 and 5, respectively, enter combustion chamber 3A via channel outlets 72 and 71, respectively. Channel outlet 71/72 may be any aperture in inner surface 2 of the combustion housing through which fluid from the respective channel may enter combustion chamber 3. Each channel 4 and 5 contains an opening 6 and 7, respectively, within the wall formed between surfaces 1 and 2 of chamber housing 10. Opening 6 of fuel channel 4 may allow for entry of fuel injectors or any other type of fuel providing apparatus/arrangement known to those skilled in the art. As previously disclosed, an opening 7 of air channel 5 may allow for entry of air from outside the combustion housing 10 or outside any other type of combustion providing apparatus/arrangement known to those skilled in the art.

In the illustrative embodiment of FIG. 9, rather than be adapted to attach to air plates 20 with spiral conduits 25A-D for air, as previously disclosed, combustion housing 10 may instead be adapted to attach to groove plates 200 with which it forms exhaust gas conduits 73 for passage and heat exchange from exhaust gas 70. These exhaust gas conduits 73 are formed by juxtaposition of labyrinthine walls on outer surface 1 of combustion housing 10, outer surface 201 of groove plate 200, or the labyrinthine walls on both constructs. Alternative embodiments are also possible as disclosed.

Figure 10:
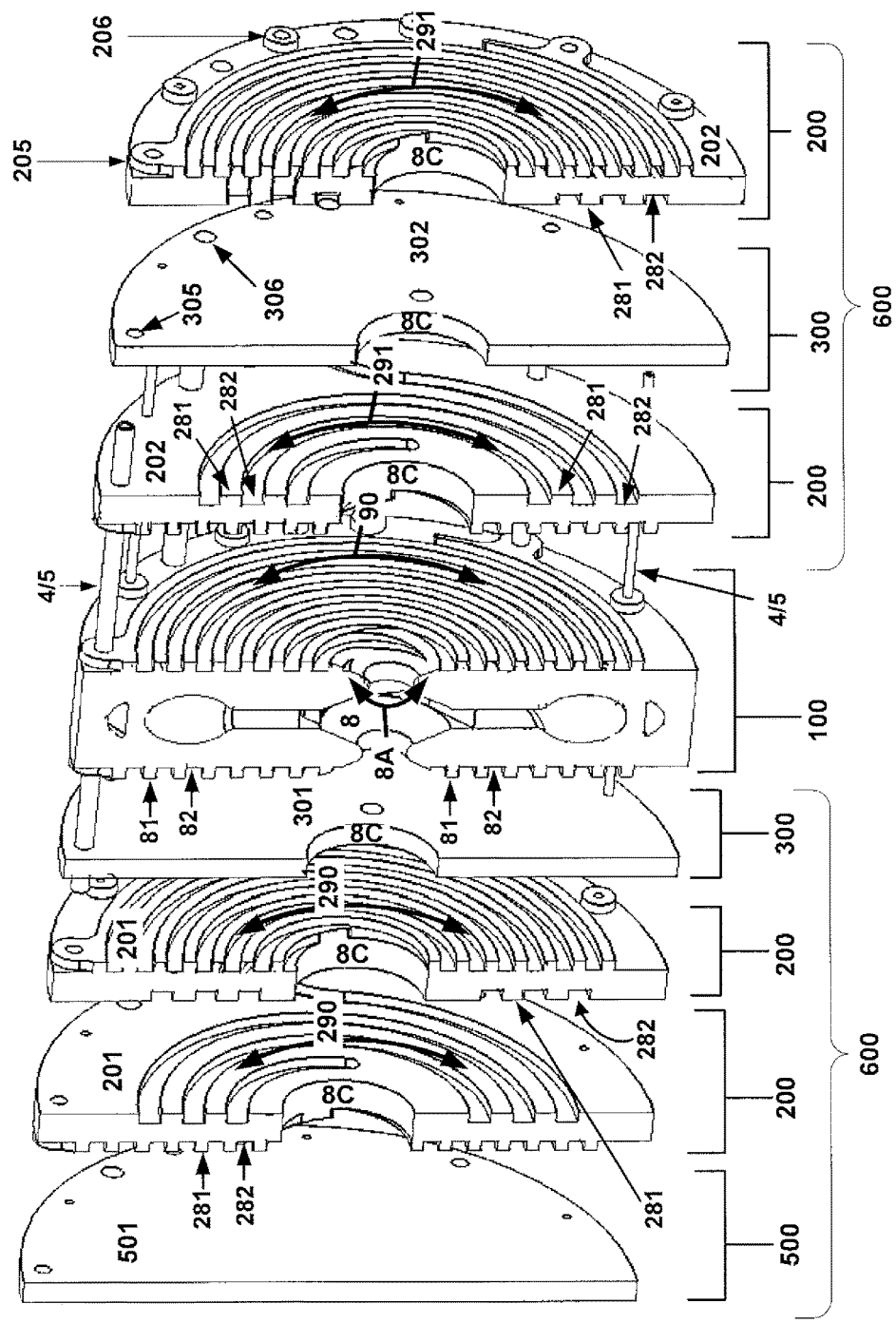
FIG. 10 illustrates an exemplary exploded view of an exemplary heat exchanger for an exemplary combustion turbine.

With reference to the illustrative embodiment of FIG. 10, combustion housing 10 may comprise a labyrinthine wall 90 extending outwardly from outer surface(s) 1. The cross section 81 of the labyrinthine wall 90 may appear as a "hill" in FIG. 9. Accordingly, an exemplary labyrinthine wall space 82 may appear as a "trough" in FIG. 9. In a preferred embodiment, hills 81 and valleys 82 may be substantially rectilinear in cross-section. In another preferred embodiment, hills 81 and valleys 82 may be complimentary of one another. In yet another preferred embodiment, the height and width of hills 81 may be substantially the same as the depth and width of valleys 82.

As further illustrated in FIG. 9, exhaust exit outer surface 8A may comprise structures which gradually extend from the housing 10 outer surface 1 and substantially blend, merge, or otherwise intersect with the wall cross section 81 of labyrinthine wall 90. In a preferred embodiment, outer surface 8A may comprise gradual extensions that spiral into the walls of labyrinthine wall 90 having a vertex proximal to exhaust exit 8 and gradually forming a rectilinear cross section 81 as the structure grows distal to exhaust exit 8. In another embodiment, outer surface 8A may have a first cross section substantially different from cross section 81 at a point proximal to exhaust exit 8 and a cross section substantially identical to cross section 81 at a point distal to exhaust exit 8. Those skilled in the machining art would understand methods and methodologies to allow walls of the labyrinthine wall 90 to extend from and grow out of exhaust exit 8 and combine any shape that seals or isolates the gas conduits 73.

In another exemplary embodiment, labyrinthine wall 90 may be a spiraling construct, which may take the form of a circular spiral wall, a rectilinear spiral wall, a trigonal spiral wall, or any other substantially non-intersecting wall forms. In a preferred embodiment, labyrinthine wall 90 may be a spiral wall with rectangular cross-section 81 and substantially orthogonal floor 82. According to the foregoing preferred embodiment, spiraling wall structures may originate on the outer surface of exhaust exit 8A and gradually grow into the spiral wall of spiral labyrinthine wall 90.

According to the embodiments previously disclosed, combustion housing 10 may be bolted, welded, or otherwise mechanically or chemically coupled to groove plate 200 so that the labyrinthine wall 90 on outer surface 1 of combustion housing 10 may contact groove plate 200 and thereby place a ceiling on the walls 81 and floor 82 of the labyrinthine wall 90, thereby forming conduits 73. As previously disclosed and with further view of FIG. 10, groove plate 200 may also contain a substantially complementary labyrinthine wall 290 that when juxtaposed with the labyrinthine wall 90 of combustion housing 10 form conduits 73.

In the illustrative embodiment of FIG. 9, labyrinthine wall 290 may have walls 281 and floor 282 that may take substantially the same or different forms from the walls 81 and floor 82 of outer surface 1 of combustion housing 10. In a preferred embodiment labyrinthine wall 290 may be a spiral with its genesis proximal to exhaust gas exit outer surface 8A. As disclosed in these embodiments, labyrinthine walls 290 may be configured to have an orientation such that exhaust gases 70 exiting from combustion housing 10 may continue to spiral into conduits 73 formed between groove plates 200 and toroidal turbine 100. In a preferred embodiment, the geometries of groove plate 200, labyrinthine wall 290, and walls 281 and floors 282 are to reduce and/or avoid shock flows of exhaust gases exiting from toroidal combustion chamber 100.

As may be further illustrated in FIG. 9, an exemplary labyrinthine wall 90 disposed on combustion housing 10 outer surface 1 may be juxtaposed with a ring plate 300. As illustrated in FIG. 10, the labyrinthine walls 90 of combustion housing 10 may be juxtaposed with either substantially complimentary labyrinthine walls 290 of groove plate 200 or surface 301/302 of ring plate 300. Ring plate 300 may be substantially flat. In an alternative embodiment, ring plate 300 surfaces 301/302 may be contoured with grooves, dimples, undulations, or other surface geometries to increase the surface area about which heat can be exchanged from incoming exhaust gases 70 exiting from toroidal combustion chamber 100. In either scenario, ring plate 300 when juxtaposed with walls 90 or 290 of either combustion housing 10 or groove plate 200 maintain conduits 73 formed as a result of such juxtaposition. In these various configurations, exhaust gases 70 from toroidal combustion chamber 100 may spiral within conduits 73 formed by the juxtaposed surfaces to allow the gases to exchange heat with the surrounding surfaces and exit out of the stacked heat exchanger plate system 700.

With reference to FIGS. 9 and 10, persons skilled in the art may use any number of groove plates 200 and plates 300 in any number of combinations to take advantage of the heat exchange capabilities of the labyrinthine wall 90 surface of toroidal combustion chamber 100. For example, inner surface 301 of plates 300 may be placed adjacent labyrinthine wall 90 of outer surface 1 of combustion housing 10 and outer surface 302 of plates 300 may be placed adjacent labyrinthine wall 290 of groove plates 200. In alternative embodiments, no plates 300 may be needed. In all embodiments, the heat exchanger system 700 may be closed by sandwich plates 500, as shown in FIGS. 10, 12, and 14A-B. Sandwich plates 500 may be used to force all exhaust gases to exit the heat exchanger system 700 by one or more labyrinthine conduits 73 formed by juxtaposition of the various labyrinthine walls 90/290 and plate surfaces 301/302.

Like plates 300 used within the heat exchanger system 700, sandwich plates 500 may be used to place ceilings atop labyrinthine walls 90/290, close off exhaust gas exit 8 from the ambient, close off the exhaust gas exit channel 8C from exhaust gas exit 8 of toroidal combustion chamber 100 (as illustrated in FIG. 10). Unlike plates 200 and 300 of heat exchanger system 700, sandwich plates 500 do not have through holes 8C that align with exhaust gas exit surface 8A.

With reference to the illustrative embodiment of FIG. 10, an exemplary heat exchanger system 700 may be shown in exploded view. According to this illustrative embodiment, an exemplary labyrinthine wall 90 on the outer surface 1 of combustion housing 10 may be a spiral with a rectilinear cross-section 81 and orthogonal floor 82. As illustrated, an exemplary complimentary labyrinthine wall 290 on the inner surface 201 of groove plate 200 may be a spiral with rectilinear cross-section 281 and orthogonal flooring 282. A labyrinthine wall 291 on the outer surface 202 of groove plate 200 may have the same or different configuration as the labyrinthine walls 90/290 of combustion housing 10 and groove plate 200 surface 201.

As further illustrated in FIG. 10, the several components of heat exchanger system 700 may have channels 205/305 for conduits for fuel/air 4/5 into toroidal combustion chamber 100. These channels 205/305 also act as alignment means for the toroidal combustion chamber 100 and plates 200/300/500 of the heat exchanger system 700. As illustrated, channels 205/305 may be substantially cylindrical. However, channels 205/305 may have other cross-sections as the need may be.

As previously disclosed, the modularity of the components of the heat exchanger system 700, including the toroidal combustion chamber 100, with or without discs 50 disposed therein, and heat exchanger stack 600, which comprises any number and arrangement of plates 200/300/500, allows for fine tuning of heat exchange and infinitely adjustable heat exchanging capabilities in order to remove heat from exhaust gases 70 resulting from the product of operation of the toroidal combustion chamber 100. The modularity of the system 700 permits use of heat exchanging stacks 600 on either or both sides of the toroidal combustion chamber 100. As previously disclosed, one may obtain power output from toroidal combustion chamber 100 while using heat exchanger stack 600 on the combustion housing 10. To do so, the toroidal combustion chamber 100 may comprise a disc pack 50 disposed on a shaft 60 for extracting useful work from combustion inside the chamber 100. On the side opposite the drive shaft 60, heat exchanger stack 600 may be coupled to the heat exchanger surface 1 of the toroidal combustion chamber 100. In this way, the toroidal combustion chamber 100 may be used as a power generating mechanism with its own customizable catalytic exhaust gas treatment system 700.

Figure 11:
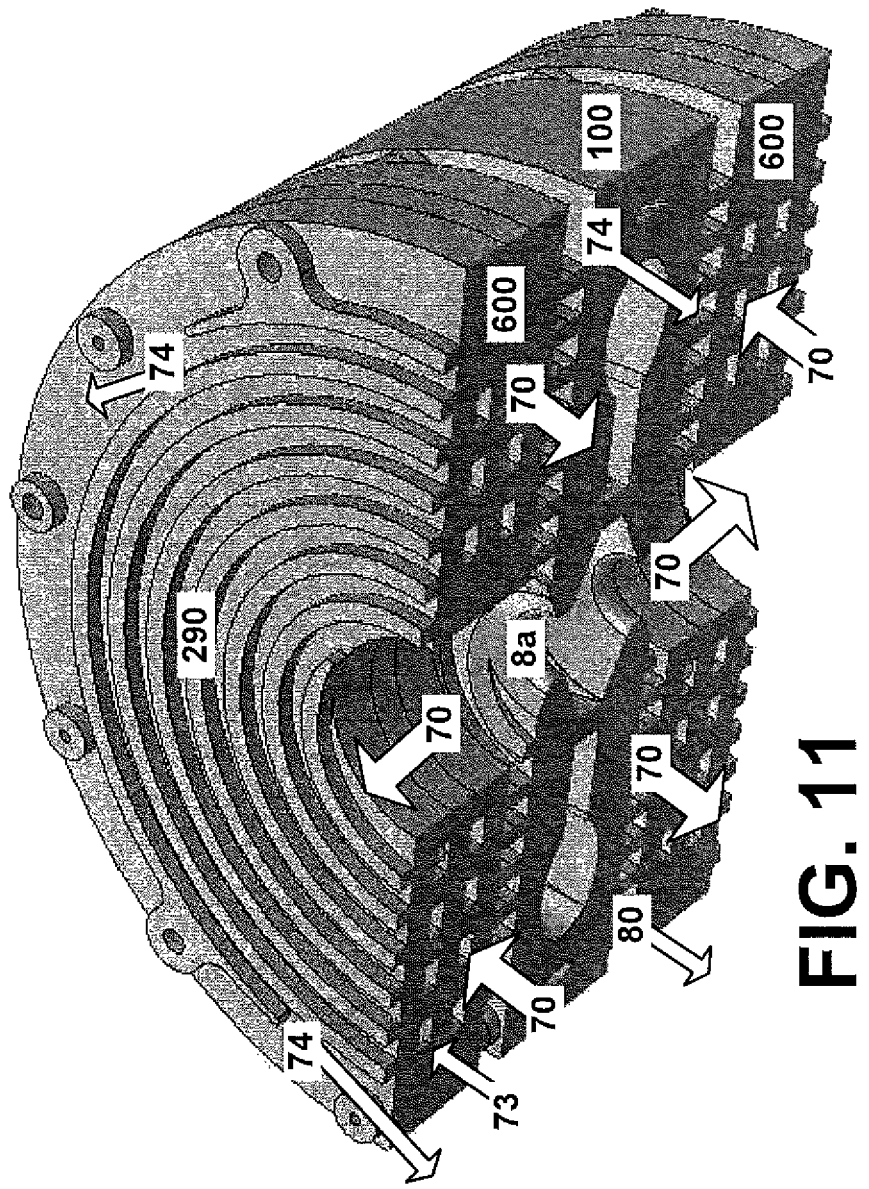
FIG. 11 illustrates an exemplary cut-away view of an exemplary heat exchanger for an exemplary combustion turbine.
Figure 12:
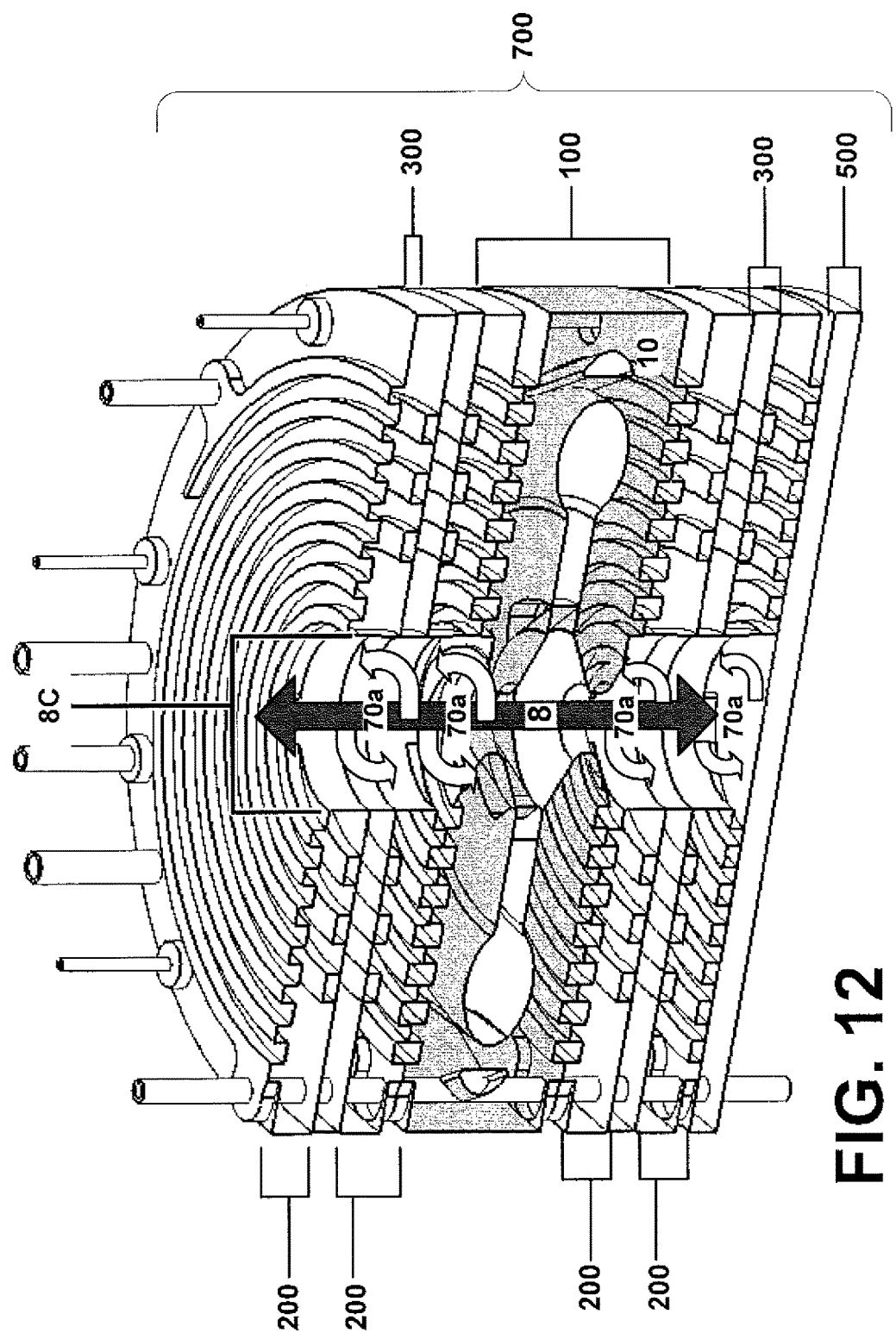
FIG. 12 illustrates another exemplary cut-away view of an exemplary heat exchanger for an exemplary combustion turbine.

In the illustrative embodiments of FIGS. 11 and 12, a cut-away view of an exemplary heat exchanger system 700 may be viewed as a combination of a toroidal combustion chamber 100 and heat exchange stacks 600. Heat exchange stacks 600 may be one or more grooved plates 200, plates 300, or combinations thereof. According to these exemplary embodiments, the juxtaposition of plates 200/300 with the labyrinthine walls 90/290 of the toroidal combustion chamber 100 and/or other grooved plates 200 or other plates 300 form a plurality of exhaust gas conduits 73 through which exhaust gases 70 from toroidal combustion chamber 100 flow. In the illustrative embodiment of FIG. 11, the labyrinthine walls have exits 74 out of which exhaust gases 70 from the toroidal combustion chamber 100 flow. In an exemplary embodiment, heat exchanger system 700 may operate to absorb substantially all exhaust gas heat from exhaust gases 70 from toroidal combustion chamber 100 to emit substantially cool exhaust gas at exits 74 of the labyrinthine walls 90/290.

As further depicted in the illustrative embodiment of FIG. 12, exhaust 70 exits from toroidal combustion chamber 100 exit 8 such that exhaust vortices 70a flow through the conduits 73 formed by juxtaposed labyrinthine walls of the adjacent plates 200/300/500 and combustion housing 10 outer surface 1. Exhaust vortices 70a may flow in substantially the same way as the combustion process achieved in toroidal combustion chamber 3, e.g., clockwise or counter-clockwise. Accordingly, in operation, an exemplary heat exchanger system operates to substantially reduce exhaust gas flow reversals.

Figure 13:
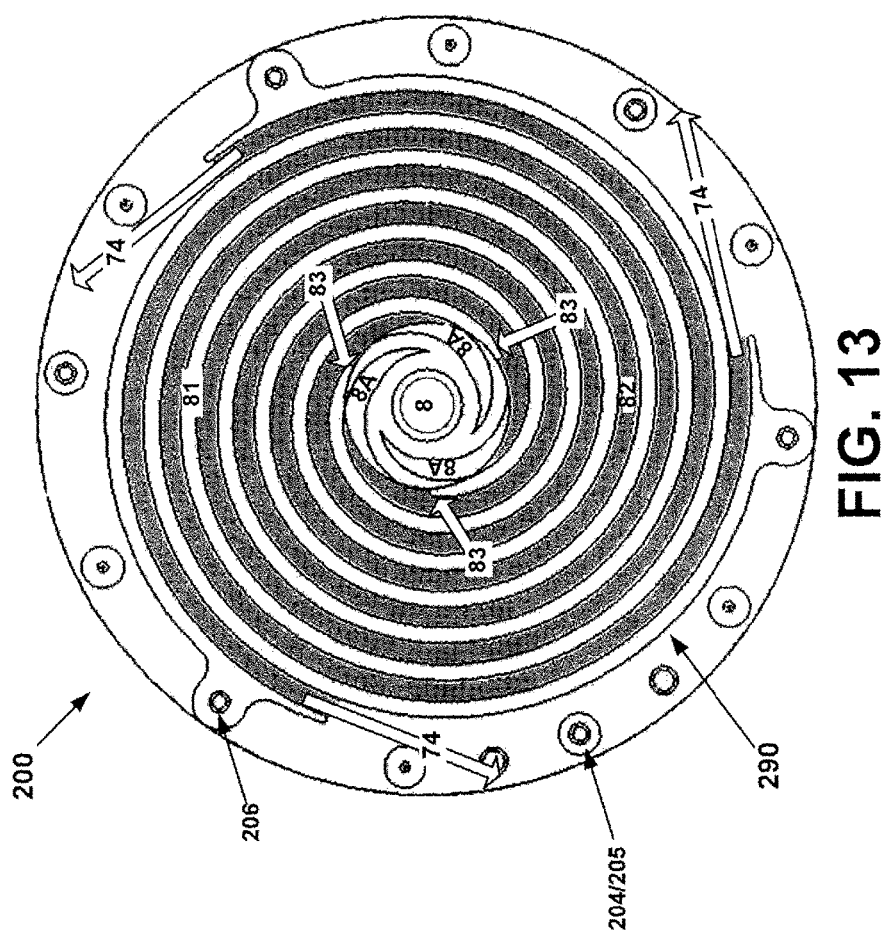
FIG. 13 illustrates an exemplary heat exchanger component for an exemplary heat exchanger according to an exemplary embodiment of the present invention.

According to the exemplary embodiment illustrated by FIG. 13, the outer surface 1 of toroidal combustion chamber 100 or an exemplary groove plate 200 may have a labyrinthine wall 290 having a thickness 81 and wall spacing 82. In a preferred embodiment, labyrinthine wall 290 may be substantially a circular spiral. In another preferred embodiment, thickness 81 may be substantially equal to spacing 82. As previously disclosed, exhaust gas 70 may flow between the spacing 82 of labyrinthine wall 290 until exiting at wall exit 74. As previously disclosed, spacing 82 of labyrinthine wall 290 may be substantially closed to form conduit 73 with either the juxtaposed and complementary labyrinthine wall 90 of combustion housing 10, labyrinthine wall 290 of another groove plate 200, or a surface 301/302 of ring plate 300.

As per the illustrative embodiment of FIG. 13, an exemplary groove plate 200 may have a labyrinthine wall with origins 83 substantially aligned with the outer surfaces 8A of toroidal combustion chamber turbine 100 exit 8. In an exemplary embodiment, origins 83 may be substantially the same configuration as outer surfaces 8A of exit 8 to reduce shock flows of exhaust gases 70 from turbine 100. Alternatively, origins 83 may be staggered so as to capture residual exhaust gas vortices 70A of exhaust gas 70 exiting from turbine 100. According to this embodiment, an exemplary exhaust gas 70 may spiral out of turbine 100 and form eddies within exhaust gas channel 8C. These eddies may be substantially different from the exhaust gas vortices 70A. As a result, a staggered arrangement of origins 83 of labyrinthine wall 290 may be utilized to capture such eddies and reduce shock flows of exhaust gas 70 and exhaust gas vortices 70A.

Alternatively, exit 8 and outer exit surface 8A form a spiral array, such as a vortex array, of walls which may be substantially continuous with exhaust gas channel 8C. Accordingly, exhaust gas channel 8C may be contoured to create a substantially well-formed vortex of exhaust gases. In an exemplary aspect of this exemplary alternative embodiment, a vortex formed by the combination of exit surface 8A and exhaust gas channel SC may form a vortex with substantially no turbulence. Labyrinthine wall 290 origins 83 may help to substantially eliminate turbulence and allow vortex exhaust gas flows 70 through exhaust gas channel 8C to smoothly enter conduits 73. As described, such constructions help to reduce exhaust gas flow reversals.

In another exemplary embodiment, labyrinthine wall 90/290 may also form part of the coupling structure or the combustion housing 10/groove plate 200. For example, a heat exchanger fuel port 206 may be integral with labyrinthine wall 290. In another example, heat exchanger fuel port 206 and fuel/air throughways 204/205 may also be integral with labyrinthine wall 290.

As per the illustrative embodiment of FIG. 13, three exhaust gas exits 74 may be shown for an exemplary labyrinthine wall 290. A similar number of exhaust gas exits 74 may be had for the labyrinthine wall 90 of combustion housing 10 upper surface 1. As would be understood to those skilled in the art, any number of exits 74 may be used depending on size, output, and requirements of an exemplary heat exchanger system 700.

Turning to the illustrative embodiment of FIG. 14A, an exemplary heat exchanger system 700 may be shown without one of the sandwich plates 500. An exemplary heat exchanger system 700 may be further placed within a sleeve 800 to further provide utilization in field operations and installation. For example, sleeve 800 may be a metal component to promote further heat exchange from the heat exchanger system 700. Sleeve 800 may be in close proximity to cooling apparatus (not shown), such as fans, cooling liquids, or other cooling mechanisms known to those skilled in the art. Alternatively, sleeve 800 may have additional fins and/or heat dissipation elements to promote further heat dissipation out of heat exchanger system 700. In another alternative embodiment, sleeve 800 may be a ceramic or cast iron construct into which the heat exchanger system 700 may be placed. Sleeve 800 may double as a heat containment housing and stabilization foundation for heat exchanger system 700 while toroidal combustion chamber 100 operates. Alternatively, sleeve 800 may act as a housing to direct exhaust gases in a unified direction instead of random dispersion, e.g., 360 degrees.

With respect to the illustrative embodiment of FIG. 14B, an exemplary sleeve 800 may have one or more openings 820 for dissipation of substantially cooled exhaust gases 70. According to the embodiment of FIG. 14B, heat exchanger system 700 may be configured so that each of combustion chamber housing 10, groove plates 200, spacer ring 300, and sandwich plates 500 are oriented and/or juxtaposed so that the exits 74 of the exhaust gas conduits 73 formed from coupling thereby are substantially aligned in the longitudinal direction. According to one such embodiment, a substantially aligned series of exits allow for optimized sleeve 800 formation by allowing for less material to be used to cover heat exchanger system 700. Additionally, such an embodiment may also result in optimized exhaust gas 70 handling by providing focused locations for receipt of exhaust gases 70 from the toroidal combustion chamber 100.

Each of the various components of a heat exchanger system may be made up of highly heat resistant and thermally conductive materials such as SiC, SiN, alumina, graphite, and technical ceramics. In a preferred embodiment, toroidal combustion chamber 100, each groove plate 200, each spacer ring 300, and each sandwich plate 500 may be made out of SiC. Fuel/air channels may also be made out of SIC. The disclosed components may be manufactured by known machining techniques and coating procedures. For example, one manufacturing method may be machining graphite with CNC mills/lathes and then CVD SiC coating the graphite parts. Alternatively, parts may be made of sintered SiC and diamond ground to finish tolerances. Because of the modular design, an exemplary heat exchanger system 700 may substitute components for lighter/more cost efficient materials depending on requirements of turbine 100 and the amount and temperature of exhaust gases 70.

As illustrated in FIGS. 14A-B, a heat exchanger system 700 may be connected to various sources to utilize fuel/air channels 4/5, e.g., compressed gases, such as air, being supplied via hoses, pumps, or compressor lines, and fuel, such as diesel, gasoline, petrol, or other combustible fluids, being supplied via direct injectors, common rail fuel lines, carbureted or metered fuel sources, or pumps. Numerous other ways may be used to supply the needed air and fuel to the toroidal combustion chamber 100 based on disclosures in this application and knowledge of those skilled in the art.

Many further variations and modifications will suggest themselves to those skilled in the art upon making reference to the above disclosure and foregoing illustrative and interrelated embodiments, which are given by way of example only, and are not intended to limit the scope and spirit of the invention described herein.

The invention claimed is:

1. A combustion chamber for a gas turbine, comprising:
a toroidal combustion chamber defined by an arcuate wall, the arcuate wall having at least one fuel passage providing fuel directly into the toroidal combustion chamber and at least one air passage providing air directly into the toroidal combustion chamber to generate a circumferential flow of combustion products,
wherein the toroidal combustion chamber encircles a toroidal nozzle which encircles an exhaust exit,
wherein the toroidal combustion chamber, the toroidal nozzle, and the exhaust exit have rotational symmetry about an axis,
the toroidal nozzle having a plurality of radial passages extending therethrough,
each radial passage of the plurality radial passages thereby establishing fluid communication to the exhaust exit,
wherein a midplane of the toroidal combustion chamber passes through each radial passage of the plurality of radial passages.

* * * * *